US011435468B2

(12) United States Patent
Giusti et al.

(10) Patent No.: US 11,435,468 B2
(45) Date of Patent: *Sep. 6, 2022

(54) RADAR-BASED GESTURE ENHANCEMENT FOR VOICE INTERFACES

(71) Applicant: Google LLC, Mountain View, CA (US)

(72) Inventors: Leonardo Giusti, San Francisco, CA (US); Ivan Poupyrev, Sunnyvale, CA (US); Brandon Barbello, Mountain View, CA (US); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,248

(22) Filed: Nov. 17, 2020

(65) Prior Publication Data

US 2021/0072370 A1 Mar. 11, 2021

Related U.S. Application Data

(63) Continuation of application No. 16/108,815, filed on Aug. 22, 2018, now Pat. No. 10,890,653.

(51) Int. Cl.
*G01S 13/42* (2006.01)
*G01S 7/02* (2006.01)
(Continued)

(52) U.S. Cl.
CPC ............. *G01S 13/426* (2013.01); *G01S 7/02* (2013.01); *G01S 13/89* (2013.01); *G06F 3/017* (2013.01); *G06F 3/167* (2013.01)

(58) Field of Classification Search
CPC .......... G01S 13/426; G01S 7/02; G01S 13/89; G01S 13/88; G06F 3/017; G06F 3/167
See application file for complete search history.

(56) References Cited

U.S. PATENT DOCUMENTS 6,971,072 B1 11/2005 Stein
7,924,212 B2 4/2011 Benitez et al.
(Continued)

FOREIGN PATENT DOCUMENTS

CL 107430443 12/2017
CN 102906623 1/2013
(Continued)

OTHER PUBLICATIONS

"Corrected Notice of Allowance", U.S. Appl. No. 16/884,943, filed Jan. 26, 2021, 2 pages.
(Continued)

*Primary Examiner* — Mamadou L Diallo
(74) *Attorney, Agent, or Firm* — Colby Nipper PLLC

(57) ABSTRACT

This document describes techniques and systems that enable radar-based gesture enhancement for voice interfaces. The techniques and systems use a radar field to accurately determine three-dimensional (3D) gestures that can be used instead of, or in combination with, a voice interface to enhance interactions with voice-controllable electronic devices. These techniques allow the user to make 3D gestures from a distance to provide a voice input trigger (e.g., a "listen" gesture), interrupt and correct inaccurate actions by the voice interface, and make natural and precise adjustments to functions controlled by voice commands.

24 Claims, 13 Drawing Sheets

(51) Int. Cl.
  *G01S 13/89* (2006.01)
  *G06F 3/01* (2006.01)
  *G06F 3/16* (2006.01)

(56) References Cited

U.S. PATENT DOCUMENTS

| | | | |
|---|---|---|---|
| 8,260,368 | B2 | 9/2012 | Yin |
| 8,560,128 | B2 | 10/2013 | Ruff et al. |
| 8,723,986 | B1 | 5/2014 | Merrill |
| 8,803,697 | B2 | 8/2014 | Rautiainen |
| 8,837,696 | B2 | 9/2014 | Meriaz et al. |
| 9,075,435 | B1 | 7/2015 | Noble et al. |
| 9,569,003 | B2 | 2/2017 | Rofougaran et al. |
| 9,589,565 | B2 | 3/2017 | Boies et al. |
| 9,600,177 | B2 | 3/2017 | Iyer et al. |
| 9,632,584 | B2 | 4/2017 | Dodge |
| 9,747,072 | B2 | 8/2017 | Noble et al. |
| 9,811,164 | B2 | 11/2017 | Poupyrev |
| 9,921,657 | B2 | 3/2018 | Sprenger et al. |
| 10,217,488 | B1* | 2/2019 | Huang ............... G06F 3/017 |
| 10,698,603 | B2 | 6/2020 | Giusti et al. |
| 10,761,611 | B2 | 9/2020 | Giusti et al. |
| 10,770,035 | B2 | 9/2020 | Giusti et al. |
| 10,788,880 | B2 | 9/2020 | Giusti et al. |
| 10,890,653 | B2 | 1/2021 | Giusti |
| 10,930,251 | B2 | 2/2021 | Giusti et al. |
| 10,936,185 | B2 | 3/2021 | Giusti et al. |
| 11,176,910 | B2 | 11/2021 | Giusti et al. |
| 11,204,694 | B2 | 12/2021 | Giusti et al. |
| 11,314,312 | B2 | 4/2022 | Giusti et al. |
| 2004/0100497 | A1 | 5/2004 | Quillen et al. |
| 2005/0002530 | A1 | 1/2005 | Kogan |
| 2005/0128124 | A1 | 6/2005 | Greneker et al. |
| 2005/0242984 | A1 | 11/2005 | Waters |
| 2007/0015559 | A1 | 1/2007 | Zalewski et al. |
| 2007/0117625 | A1 | 5/2007 | Marks et al. |
| 2007/0202858 | A1 | 8/2007 | Yu |
| 2008/0029316 | A1 | 2/2008 | Jaeger et al. |
| 2008/0055105 | A1 | 3/2008 | Blum et al. |
| 2009/0228841 | A1 | 9/2009 | Hildreth |
| 2009/0237371 | A1 | 9/2009 | Kim |
| 2009/0322690 | A1 | 12/2009 | Hiltunen et al. |
| 2010/0017722 | A1 | 1/2010 | Cohen |
| 2011/0181509 | A1 | 7/2011 | Rautiainen et al. |
| 2011/0181510 | A1 | 7/2011 | Hakala et al. |
| 2011/0221667 | A1 | 9/2011 | Lee |
| 2011/0237274 | A1 | 9/2011 | Wong et al. |
| 2011/0313768 | A1 | 12/2011 | Klein et al. |
| 2012/0280900 | A1* | 11/2012 | Wang ............... G06F 3/017 345/156 |
| 2013/0023248 | A1 | 1/2013 | Lee |
| 2013/0053007 | A1* | 2/2013 | Cosman ............... H04W 4/21 455/414.3 |
| 2013/0057571 | A1 | 3/2013 | Harris |
| 2013/0120458 | A1 | 5/2013 | Celebisoy et al. |
| 2013/0241823 | A1 | 9/2013 | Pryor |
| 2013/0300671 | A1 | 11/2013 | Hallerström Sjöstedt et al. |
| 2014/0267130 | A1 | 9/2014 | Hwang et al. |
| 2014/0315531 | A1 | 10/2014 | Joong et al. |
| 2014/0347188 | A1 | 11/2014 | Alameh et al. |
| 2014/0379341 | A1 | 12/2014 | Seo et al. |
| 2014/0380249 | A1 | 12/2014 | Fleizach |
| 2015/0036999 | A1 | 2/2015 | Batur et al. |
| 2015/0145993 | A1 | 5/2015 | Scalisi |
| 2015/0186569 | A1 | 7/2015 | Sekine et al. |
| 2015/0187137 | A1 | 7/2015 | Mullins |
| 2015/0277569 | A1 | 10/2015 | Sprenger et al. |
| 2015/0346820 | A1 | 12/2015 | Poupyrev et al. |
| 2015/0365540 | A1 | 12/2015 | Davis et al. |
| 2015/0370443 | A1 | 12/2015 | Ben-Bassat |
| 2015/0370472 | A1 | 12/2015 | Privault et al. |
| 2016/0026327 | A1 | 1/2016 | Park et al. |
| 2016/0041617 | A1 | 2/2016 | Poupyrev |
| 2016/0041618 | A1 | 2/2016 | Poupyrev |
| 2016/0054803 | A1* | 2/2016 | Poupyrev ............... G06F 3/017 345/156 |
| 2016/0062590 | A1 | 3/2016 | Karunamuni et al. |
| 2016/0098089 | A1 | 4/2016 | Poupyrev |
| 2016/0140763 | A1 | 5/2016 | Seichter et al. |
| 2016/0162145 | A1 | 6/2016 | Rivers et al. |
| 2016/0234369 | A1 | 8/2016 | Jung et al. |
| 2016/0241720 | A1 | 8/2016 | Cheatham et al. |
| 2016/0252607 | A1* | 9/2016 | Saboo ............... G06F 3/017 342/107 |
| 2016/0259037 | A1 | 9/2016 | Molchanov et al. |
| 2016/0358588 | A1 | 12/2016 | O'Neill |
| 2017/0040002 | A1 | 2/2017 | Basson et al. |
| 2017/0097413 | A1* | 4/2017 | Gillian ............... G01S 7/4004 |
| 2017/0235458 | A1 | 8/2017 | Tsurumi |
| 2017/0289766 | A1 | 10/2017 | Scott et al. |
| 2017/0289954 | A1 | 10/2017 | Mese et al. |
| 2017/0308131 | A1 | 10/2017 | Geva |
| 2017/0328997 | A1 | 11/2017 | Silverstein et al. |
| 2017/0329449 | A1 | 11/2017 | Silverstein et al. |
| 2017/0349184 | A1* | 12/2017 | Tzirkel-Hancock ............... B60W 50/08 |
| 2018/0018965 | A1* | 1/2018 | Daley ............... G06F 3/017 |
| 2018/0032997 | A1 | 2/2018 | Gordon et al. |
| 2018/0098351 | A1 | 4/2018 | Amel et al. |
| 2018/0120946 | A1 | 5/2018 | Cho |
| 2018/0224980 | A1 | 8/2018 | Avila et al. |
| 2018/0329049 | A1 | 11/2018 | Amihood et al. |
| 2018/0374143 | A1 | 12/2018 | Williamson et al. |
| 2019/0286912 | A1 | 9/2019 | Chan et al. |
| 2020/0057504 | A1 | 2/2020 | Lien et al. |
| 2020/0064445 | A1 | 2/2020 | Amihood et al. |
| 2020/0064458 | A1 | 2/2020 | Giusti et al. |
| 2020/0064996 | A1 | 2/2020 | Giusti et al. |
| 2020/0066236 | A1 | 2/2020 | Giusti et al. |
| 2020/0125158 | A1 | 4/2020 | Giusti et al. |
| 2020/0150771 | A1 | 5/2020 | Giusti et al. |
| 2020/0193942 | A1 | 6/2020 | Giusti et al. |
| 2020/0272322 | A1 | 8/2020 | Zhu et al. |
| 2020/0285383 | A1 | 9/2020 | Giusti et al. |
| 2020/0372879 | A1 | 11/2020 | Giusti et al. |
| 2021/0026434 | A1 | 1/2021 | Giusti et al. |
| 2021/0132788 | A1 | 5/2021 | Giusti et al. |
| 2022/0036863 | A1 | 2/2022 | Giusti et al. |

FOREIGN PATENT DOCUMENTS

| | | |
|---|---|---|
| CN | 103858073 | 6/2014 |
| CN | 204145834 | 2/2015 |
| CN | 104793731 | 7/2015 |
| CN | 105264461 | 1/2016 |
| CN | 107077169 | 8/2017 |
| CN | 107765846 | 3/2018 |
| CN | 108334199 | 7/2018 |
| EP | 0325539 | 7/1989 |
| EP | 1309211 | 5/2003 |
| EP | 2560145 | 2/2013 |
| EP | 2637079 | 9/2013 |
| EP | 2887092 | 6/2015 |
| GB | 2554957 | 4/2018 |
| JP | H11338120 | 12/1999 |
| JP | 2001033550 | 2/2001 |
| JP | 2006013819 | 1/2006 |
| JP | 2009237371 | 10/2009 |
| JP | 2010038607 | 2/2010 |
| JP | 2012048720 | 3/2012 |
| JP | 2013125328 | 6/2013 |
| JP | 2013546066 | 12/2013 |
| JP | 2014197317 | 10/2014 |
| JP | 2015141588 | 8/2015 |
| JP | 2015203835 | 11/2015 |
| JP | 2016035625 | 3/2016 |
| JP | 2016205907 | 12/2016 |
| JP | 2017111711 | 6/2017 |
| JP | 2018116653 | 7/2018 |
| JP | 2018527558 | 9/2018 |
| KR | 20160128318 | 11/2016 |
| KR | 20160148640 | 12/2016 |
| KR | 20180030123 | 3/2018 |

(56) References Cited

FOREIGN PATENT DOCUMENTS

| | | |
|---|---|---|
| TW | 201228332 | 7/2012 |
| TW | 201445029 | 12/2014 |
| TW | 201606572 | 2/2016 |
| TW | I610084 | 3/2016 |
| TW | I514193 | 7/2016 |
| TW | 201727439 | 8/2017 |
| WO | 2011149659 | 12/2011 |
| WO | 2016017978 | 2/2016 |
| WO | 2017018388 | 2/2017 |
| WO | 2018004757 | 1/2018 |
| WO | 2018118895 | 6/2018 |
| WO | 2018208958 | 11/2018 |
| WO | 2020040966 | 2/2020 |
| WO | 2020040968 | 2/2020 |
| WO | 2020040970 | 2/2020 |
| WO | 2020086215 | 4/2020 |
| WO | 2020101810 | 5/2020 |

OTHER PUBLICATIONS

"Corrected Notice of Allowance", U.S. Appl. No. 16/802,024, filed Jan. 28, 2021, 2 pages.
"Corrected Notice of Allowance", U.S. Appl. No. 16/108,815, filed Dec. 8, 2020, 2 pages.
"Corrected Notice of Allowance", U.S. Appl. No. 16/108,815, filed Dec. 17, 2020, 2 pages.
"Corrected Notice of Allowance", U.S. Appl. No. 16/802,024, filed Dec. 23, 2020, 3 pages.
"Foreign Office Action", JP Application No. 2020520030, dated Jan. 12, 2021, 11 pages.
"Foreign Office Action", JP Application No. 2020-090667, dated Nov. 17, 2020, 6 pages.
"Foreign Office Action", TW Application No. 108123712, dated Dec. 22, 2020, 2 pages.
"Notice of Allowance", U.S. Appl. No. 16/802,024, filed Dec. 11, 2020, 5 pages.
"Supplemental Notice of Allowance", U.S. Appl. No. 16/884,943, filed Dec. 7, 2020, 2 pages.
"Foreign Office Action", TW Application No. 108123886, dated Mar. 5, 2021, 21 pages.
"International Preliminary Report on Patentability", Application No. PCT/US2019/045142, dated Feb. 23, 2021, 11 pages.
"International Preliminary Report on Patentability", Application No. PCT/US2019/045144, dated Feb. 23, 2021, 11 pages.
"International Preliminary Report on Patentability", Application No. PCT/US2019/045128, dated Mar. 2, 2021, 15 pages.
"International Preliminary Report on Patentability", Application No. PCT/US2019/053602, dated Apr. 27, 2021, 15 pages.
"Foreign Office Action", KR Application No. 10-2020-7013505, dated Jul. 5, 2021, 6 pages.
"Foreign Office Action", KR Application No. 10-2020-7033558, dated Jul. 5, 2021, 6 pages.
"Foreign Office Action", IN Application No. 202047011909, dated Aug. 4, 2021, 6 pages.
"Notice of Allowance", U.S. Appl. No. 16/986,062, filed Jul. 12, 2021, 8 pages.
"International Preliminary Report on Patentability", Application No. PCT/US2019/053568, dated May 18, 2021, 8 pages.
"Non-Final Office Action", U.S. Appl. No. 17/148,414, Jul. 2, 2021, 10 pages.
"Non-Final Office Action", U.S. Appl. No. 17/035,059, filed Aug. 5, 2021, 6 pages.
"Foreign Office Action", KR Application No. 10-2020-7012253, dated Nov. 1, 2021, 13 pages.
"Foreign Office Action", TW Application No. 109141179, dated Nov. 29, 2021, 12 pages.
"Foreign Office Action", IN Application No. 202048017849, dated Dec. 22, 2021, 6 pages.
"Notice of Allowance", U.S. Appl. No. 17/035,059, filed Nov. 29, 2021, 7 pages.

"EP Appeal Decision", European Application No. 10194359.5, dated May 28, 2019, 20 pages.
"Extended European Search Report", EP Application No. 20172743.5, dated Sep. 9, 2020, 11 pages.
"First Action Interview Office Action", U.S. Appl. No. 16/189,346, filed Jan. 14, 2020, 3 Pages.
"First Action Interview Office Action", U.S. Appl. No. 16/109,534, filed Mar. 17, 2020, 3 Pages.
"Foreign Office Action", EP Application No. 19755482.7, dated Jun. 17, 2020, 4 pages.
"Foreign Office Action", TW Application No. 108123887, dated Jul. 15, 2020, 8 pages.
"Foreign Office Action", CN Application No. 201980004742.2, dated Aug. 5, 20, 16 pages.
"Foreign Office Action", TW Application No. 108123886, dated Aug. 26, 2020, 23 pages.
"Foreign Office Action", EP Application No. 19755482.7, dated Sep. 15, 2020, 11 pages.
"Foreign Office Action", Korean Application No. 1020207008514, dated May 15, 2020, 6 pages.
"Foreign Office Action", TW Application No. 108123712, dated Aug. 17, 2020, 12 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Search Report and Written Opinion", PCT Application No. PCT/US2019/045128, dated Jan. 14, 2020, 22 pages.
"International Search Report and Written Opinion", PCT Application No. PCT/US2019/045144, dated Jan. 2, 2020, 18 pages.
"International Search Report and Written Opinion", PCT Application No. PCT/US2019/053568, dated Dec. 20, 2019, 14 pages.
"International Search Report and Written Opinion", PCT Application No. PCT/US2019/053602, dated Dec. 6, 2019, 23 pages.
"International Search Report and Written Opinion", PCT Application No. PCT/US2019/045142, dated Feb. 10, 2020, 19 pages.
"Invitation to Pay Additional Fees", PCT Application No. PCT/US2019/045144, dated Oct. 28, 2019, 10 pages.
"Invitation to Pay Additional Fees", PCT Application No. PCT/US2019/045142, dated Oct. 29, 2019, 10 pages.
"Invitation to Pay Additional Fees", PCT Application No. PCT/US2019/045128, dated Nov. 11, 2019, 16 pages.
"Micropower Impulse Radar (MIR)", Ohio State et al., retrieved from the internet: http:..web.cse.ohio-state.edu/siefast/nest/nest_webpage/posters/OSU-poster-alineinthestand-MIR.pdf, Sep. 1, 2003, 1 page.
"Non-Final Office Action", U.S. Appl. No. 16/112,130, filed Sep. 20, 2019, 14 Pages.
"Non-Final Office Action", U.S. Appl. No. 16/802,024, filed Oct. 7, 2020, 10 Pages.
"Notice of Allowance", U.S. Appl. No. 16/112,130, filed Feb. 19, 2020, 8 Pages.
"Notice of Allowance", U.S. Appl. No. 16/189,346, dated Apr. 15, 2020, 6 Pages.
"Notice of Allowance", U.S. Appl. No. 16/109,534, dated Apr. 30, 2020, 5 Pages.
"Notice of Allowance", U.S. Appl. No. 16/166,900, filed May 15, 2020, 7 Pages.
"Notice of Allowance", U.S. Appl. No. 16/108,815, filed Sep. 15, 2020, 7 Pages.
"Notice of Allowance", U.S. Appl. No. 16/884,943, filed Oct. 28, 2020, 11 pages.
"Position Sensors", https://developer.android.com/guide/topics/sensors/sensors_position.html, downloaded Mar. 22, 18, 5 pages.
"Pre-Interview Communication", U.S. Appl. No. 16/109,534, filed Feb. 19, 2020, 3 Pages.
"Pre-Interview Communication", U.S. Appl. No. 16/166,900, filed Mar. 19, 2020, 4 Pages.
"Pre-Interview Communication", U.S. Appl. No. 16/189,346, filed Dec. 13, 2019, 5 Pages.
"Pre-Interview Communication", U.S. Appl. No. 16/108,815, dated Jun. 8, 2020, 3 pages.
"Restriction Requirement", U.S. Appl. No. 16/109,534, filed Jan. 7, 2020, 6 Pages.

(56) References Cited

OTHER PUBLICATIONS

"Samsung Galaxy S4 Air Gestures", Video retrieved from https://www.youtube.com/watch?v=375Hb87yGcg, May 7, 2013, 4 pages.
Cravotta, "Optimizing Proximity Sensing for Consumer Electronics Applications", Apr. 26, 2012, 7 pages.
Lien, et al., "Soli: Ubiquitous Gesture Sensing with Millimeter Wave Radar", ACM Trans. Graph., vol. 35, No. 4, Article 142, Jul. 1, 2016, 19 pages.
Paulson, et al., "Ultra-Wideband Radar Methods and Techniques of Medical Sensing and Imaging", SPIE, PO Box 10 Bellingham, Wa, 98227-0010, USA, Sep. 2, 2003, XP040212116, 12 pages.
"Foreign Notice of Allowance", KR Application No. 10-2020-7033558, dated Sep. 6, 2021, 2 pages.
"Foreign Office Action", TW Application No. 108123886, dated Jul. 29, 2021, 16 pages.
"Notice of Allowance", U.S. Appl. No. 17/148,414, filed Sep. 14, 2021, 12 pages.
"Foreign Office Action", EP Application No. 19790359.4, dated Feb. 2, 2022, 8 pages.
"Foreign Office Action", EP Application No. 19759456.7, dated Feb. 16, 2022, 4 pages.
"Foreign Office Action", JP Application No. 2021-037423, dated Mar. 8, 2022, 10 pages.
"Foreign Office Action", KR Application No. 10-2020-7012253, dated Mar. 10, 2022, 5 pages.

* cited by examiner

RADAR-BASED GESTURE ENHANCEMENT FOR VOICE INTERFACES

RELATED APPLICATION

The present application is a continuation of and claims priority to U.S. patent application Ser. No. 16/108,815, filed Aug. 22, 2018, the entire disclosure of which is hereby incorporated by reference.

BACKGROUND

Smartphones are not used just to communicate and shop. Increasingly, smartphones are used to control and interact with our environment through smart-home or home-automation systems. Through these systems, users can play music or other audio, turn lights on and off, adjust thermostats and appliances, and control many other functions. Users of smart-home systems often use voice commands to interact with applications on their electronic devices, especially when touch inputs are difficult or inconvenient, such as when a room is dark or the user's smartphone is out of reach. For example, many smartphones and smart-home systems include a voice interface (sometimes called a voice assistant) that listens for its name or other activation word and, once activated, can perform tasks based on voice commands. Voice interfaces use speech-recognition techniques to enable simple voice commands, such as turning lights on or off, adjusting audio volume levels, and so forth. Using a voice interface to interact with an electronic device to perform more-complex tasks, however, can be inconvenient, ineffective, and frustrating.

In particular, as more and more devices become able to receive voice commands, it can be a challenge for users to make complex, device-specific voice commands via a voice interface. In part, these difficulties arise because human conversation and communication is a mix of verbal and nonverbal communication, but a voice interface can only understand the verbal part of voice commands. For example, a command to turn on the lights may result in every light being turned on when the user meant to turn on only a reading lamp. A command to turn the music up can be similarly misunderstood by the voice interface unless the user adds details to explain how much to turn the music up or engages in a back-and-forth dialog with the voice interface until the volume is correct. Additionally, once the voice interface starts talking or performing a task improperly, it can be difficult to interrupt and correct the voice interface. Further, to be able to respond to voice commands, the voice interface must be listening nearly all the time, which can increase power consumption and lead to unintentional commands or unexpected interruptions by the voice interface. These and other problems can lead to frustration and inaccurate or incomplete input. Thus, users may not realize the full potential of their electronic devices because of the limitations of voice interfaces.

SUMMARY

This document describes techniques and systems that enable radar-based gesture enhancement for voice interfaces. The techniques and systems use a radar field to accurately determine three-dimensional (3D) gestures that can be used instead of, or in combination with, a voice interface to enhance interactions with voice-controllable electronic devices. These techniques allow the user to make 3D gestures from a distance to provide a voice input trigger (e.g., a "listen" gesture), interrupt and correct inaccurate actions by the voice interface, and make natural and precise adjustments to functions controlled by voice commands.

Aspects described below include a smartphone comprising a microphone, a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer-readable media include stored instructions that can be executed by the one or more computer processors to implement a radar-based application. The radar-based application maintains the microphone in a non-operational mode. The radar-based application also detects, based on the radar data, a gesture by the object in the radar field and determines, based on the radar data, that the gesture is a voice input trigger. In response to determining that the gesture is the voice input trigger, the radar-based application causes the microphone to enter an operational mode.

Aspects described below also include a system comprising an electronic device that includes a microphone, a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer-readable media include stored instructions that can be executed by the one or more computer processors to implement an interaction manager. The interaction manager generates a virtual map of an environment. The virtual map identifies a location and a type of one or more devices in the environment that can be interacted with via the interaction manager. The interaction manager receives, at a first time, a voice command directed to at least one of the one or more identified devices, and the voice command includes at least the type of the at least one device. At a second time that is later than, or at approximately a same time as, the first time, the interaction manager determines, based on the radar data, a three-dimensional (3D) gesture. The 3D gesture corresponds to a sub-command that is related to the voice command. In response to the voice command and the 3D gesture, the interaction manager causes the at least one of the one or more devices to perform an action that corresponds to the voice command and the sub-command.

Aspects described below also include a method, implemented in an electronic device that includes a radar system, a radar-based application, and a microphone. The method comprises providing, by the radar system, a radar field. The method also includes sensing, by the radar system, reflections from an object in the radar field and analyzing the reflections from the object in the radar field. The method further includes providing, based on the analysis of the reflections, radar data and maintaining, by the radar-based application, the microphone in a non-operational mode. The method also includes detecting, based on the radar data, a gesture by the object in the radar field and determining, based on the radar data, that the gesture is a voice input trigger. In response to determining that the gesture is the voice input trigger, the radar-based application causes the microphone to enter an operational mode.

Aspects described below also include a system comprising an electronic device that includes, or is associated with, a microphone and means for providing a radar field and detecting a gesture by an object in the radar field. The system also includes means for maintaining the microphone in a non-operational mode and determining that the gesture by the object in the radar field is a voice input trigger. The system also includes means for, responsive to determining the voice input trigger, causing the microphone to enter an operational mode.

This summary is provided to introduce simplified concepts concerning radar-based gesture enhancement for voice interfaces, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of radar-based gesture enhancement for voice interfaces are described in this document with reference to the following drawings. The same numbers are used throughout the drawings to reference like features and components.

DETAILED DESCRIPTION

Overview

Figure 1:
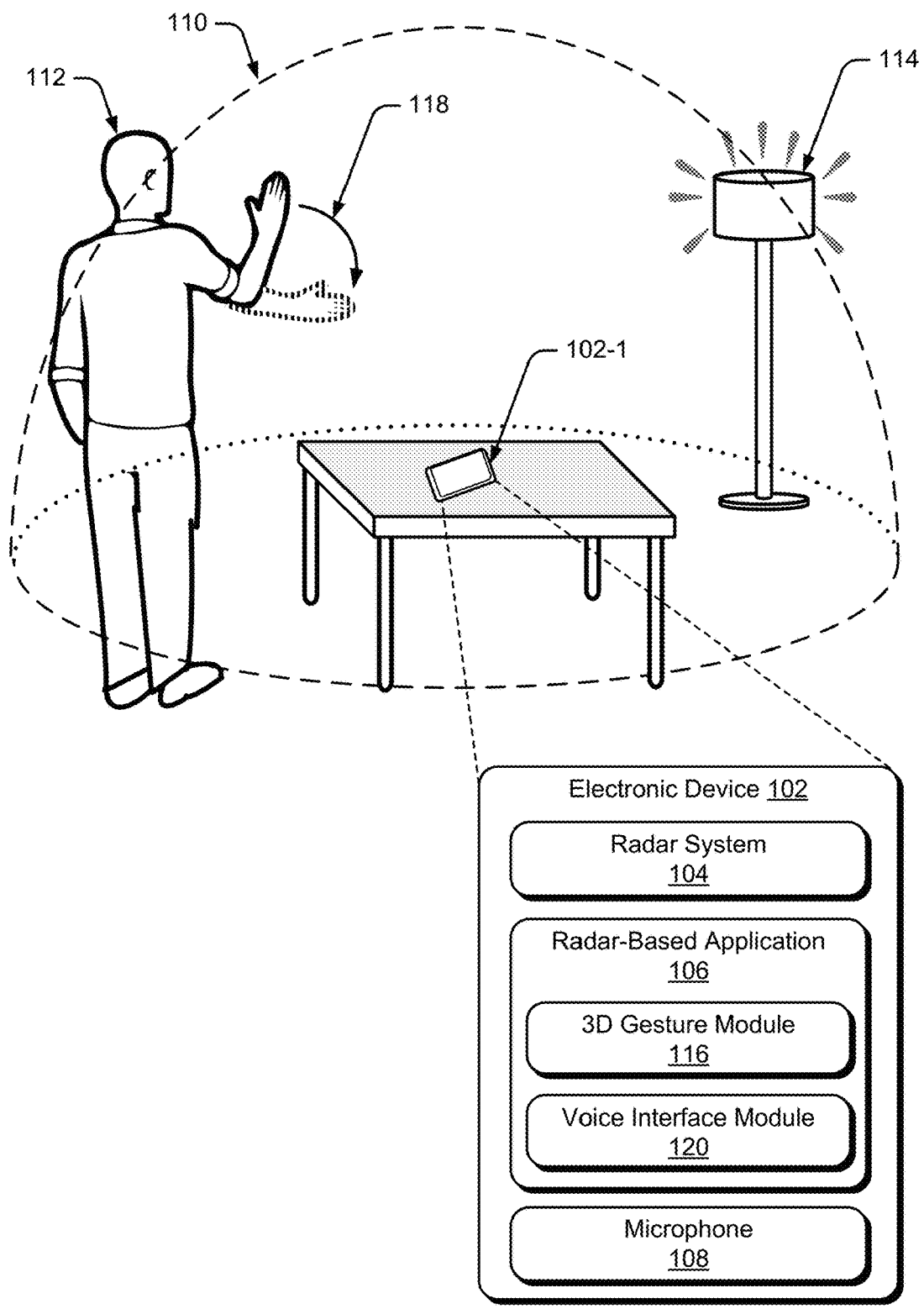
FIG. 1 illustrates an example environment in which techniques enabling radar-based gesture enhancement for voice interfaces can be implemented.

This document describes techniques and systems that enable radar-based gesture enhancement for voice interfaces. As noted, it can be challenging to give complex, device-specific voice commands via a voice interface because humans communicate using a mix of verbal and nonverbal communication, but the voice interface only understands the verbal portion. Thus, users may not realize the full potential of their smart-home features because of the limitations of voice interfaces. The techniques and systems employ a radar system to accurately determine three-dimensional (3D) gestures (e.g., a gesture that comprises one or more movements, in any direction, within a 3D space illuminated by a radar field, as described in this document). The 3D gestures can be used instead of, or in combination with, the voice interface to enhance interactions with voice-controllable devices. Because the user can make 3D gestures from a distance, the device providing the voice interface can remain in a non-operational (or non-listening) mode until the user provides a voice input trigger (e.g., a "listen" gesture), which can save power, increase privacy, and reduce unintentional commands.

Additionally, when the user wants to make an analog change, such as adjusting a volume setting for a music player or changing a lighting level, voice commands by themselves often allow little flexibility. For example, the user may say "turn lights down" or "increase volume" to adjust these functions. Additional voice commands may then be necessary to fine-tune the adjustments. Using the radar system with the described techniques, the user can employ voice commands, along with gestures, for tasks such as adjusting typically analog controls, like light level or music volume. A voice command, along with an intuitive 3D gesture specifying how much to lower the lights or increase the volume, allows the user to interact with the electronic device in a simple and natural way that more-closely matches typical human communication style. For example, the user may say "lower lights" while lowering a hand or say "increase volume" while making a gesture that has a motion of turning a volume dial.

Further, some voice interfaces may give audio responses to confirm the command or indicate that the command is being performed. Once the voice interface starts responding or is performing a task improperly, it can be difficult to interrupt and correct the voice interface. Using the described techniques, the user can use 3D gestures to interrupt and correct the voice interface, allowing the user to be more effective. Thus, the described techniques and systems can improve the quality and effectiveness of the user's experience and thereby increase the user's efficiency, work flow, and enjoyment.

Consider an electronic device that includes a radar-based application with a voice interface that can be used to control appliances and other devices in a home. For example, the radar-based application may allow a user to control a thermostat or home security system, or to make real-time adjustments to a volume of an entertainment system or a brightness level of dimmable lights in a room. In this example, the electronic device may include various cameras and microphones to enable the voice interface. A conventional voice interface can receive voice commands and perform the actions associated with the commands. Thus, the user may give voice commands that control simple functions, such as turning lights on or off, adjusting audio volume levels, and so forth. The conventional voice interface, however, is typically less effective for complex commands and fine-tuning adjustments in an analog manner. For example, when a movie is over and the credits are playing, the user may wish to turn up the lighting in a home-theater room and turn down the volume of the home-theater speakers. To do so, the user gives several commands, possibly beginning with a listen prompt to alert the voice interface that voice commands are about to be given. Then, the user issues the relevant voice commands, which may include multiple iterations (e.g., "lights up sixty percent" then "lights down twenty percent" and then "volume down fifty percent"). Even after adjusting the lights and volume up and down, the user can still be unsatisfied with the results and have to resort to manual controls. Consistently difficult or inconvenient interactions with the voice interface can reduce efficiency and the quality of the user's experience with the voice interface, or even reduce the likelihood that the user will use the voice interface.

Contrast these conventional techniques with the systems and techniques described in this document, which can improve efficiency and usability in several areas. For instance, in the example above, the user is trying to make adjustments to light and audio volume levels, for which an analog adjustment, such as a rheostat on a dimmer switch or a volume dial on a stereo, would be a natural and intuitive control. In this situation, the electronic device may include a radar system that can provide a radar field that extends into an area around the device (e.g., a five- or eight-foot radius around the device). The radar sensors can use radar signals reflected from objects that enter the radar field to detect gestures made by the user, in combination with a voice command, to enable the user to fine-tune the light and audio volume levels.

In this way, the described techniques and systems allow efficient and natural interaction with voice-controlled devices. The user can enjoy the advantages and convenience of voice control, while using 3D gestures to provide additional flexibility and enhanced functionality. This can improve efficiency and reduce user frustration, such as having to adjust and re-adjust various devices to achieve the desired result, which increases the quality of the user experience. Further, power consumption of the radar system can be substantially less than some conventional techniques that may use an always-on microphone to enable the voice interface.

These are but a few examples of how the techniques and devices described herein may be used to allow users to interact with devices using both a voice interface and 3D gestures. Other examples and implementations of which are described throughout this document. The document now turns to an example environment, after which example systems, apparatuses, methods, and components are described.

Operating Environment

FIG. 1 illustrates an example environment 100 in which techniques enabling radar-based gesture enhancement for voice interfaces can be implemented. The example environment 100 includes an electronic device 102, which includes, or is associated with, a radar system 104, a radar-based application 106, and a microphone 108. In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the electronic device 102, in this case a smartphone 102-1, to sense and analyze reflections from an object 112 in the radar field 110.

The object 112 may be any of a variety of objects that the radar system 104 can sense and analyze reflections from, such as wood, plastic, metal, fabric, or human body parts (e.g., a hand of a user of the electronic device 102). As shown in FIG. 1, the object 112 is a person or a user of the smartphone 102-1 (person 112 or user 112). Based on the analysis of the reflections, the radar system 104 can provide radar data that includes various types of information associated with the radar field 110 and the reflections from the object 112, as described below with reference to FIGS. 3-6 (e.g., the radar system 104 can pass the radar data to other entities, such as the radar-based application 106).

It should be noted that the radar data may be continuously or periodically provided over time, based on the sensed and analyzed reflections from the object 112 in the radar field 110. A position of the object 112 can change over time (e.g., the object 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The radar-based application 106 may be any of a variety of radar-based applications that can receive voice commands or instructions (e.g., through the microphone 108), which can be used to interact with the electronic device 102 or with a variety of other devices, such as home appliances, security systems, entertainment systems, lights (e.g., a lamp 114), or an internet-of-things (JOT) device. In some implementations, the radar-based application 106 is, or includes, a voice assistant (e.g., a system-specific voice assistant associated with a particular brand or type of home-automation system or a generic voice assistant that can work with a variety of home-automation systems and devices).

The radar-based application 106 can also control the microphone 108, such as by maintaining the microphone 108 in a non-operational mode. The non-operational mode can be a mode in which the microphone 108 is powered off and cannot receive, analyze, or record audio input. In other implementations, the non-operational mode may be a mode in which the microphone 108 is connected to power and can receive audio input, but cannot be used to record, analyze, or otherwise act on the audio input. The powered non-operational mode may be achieved using various methods (e.g., a software or firmware control signal or a hardware control, such as a switch) that prohibit data transfer from the microphone 108 to memory devices, processors, or other devices. The powered non-operational mode may be used with electronic devices 102 that use a combination component that serves as both a speaker and a microphone to enable these electronic devices 102 to produce sound when in the non-operational mode. The powered non-operational mode can also reduce the likelihood that the microphone 108 misses the beginning of an audio command if there is a delay between applying power and being able to receive audio input.

The radar-based application 106 may also include a 3D gesture module 116, which can store both information related to determining 3D gestures based on the radar data and information related to actions that correspond to the 3D gestures. Based on the radar data, the radar-based application 106 can detect the 3D gesture by the user 112 and determine that the gesture is a voice input trigger (e.g., using the 3D gesture module 116). The voice input trigger is an indication to the radar-based application 106 that it may receive voice input (or voice commands). In response to determining that the 3D gesture is the voice input trigger, the radar-based application 106 causes the microphone 108 to enter an operational mode that enables the microphone 108 to receive, and act on, voice commands or other audio input. In some implementations, the radar-based application 106 can also cause the microphone 108 to enter, or re-enter, the non-operational mode when the radar-based application 106 does not receive a voice or other audio input within a threshold time of receiving the voice input trigger. Because the radar-based application 106 can maintain the microphone 108 in a non-operational mode until the voice input trigger is received, users may have increased privacy and a frequency of inadvertent or unintentional voice commands may be reduced.

A 3D gesture can be any of a variety of gestures, including a scrolling gesture made by moving a hand above the electronic device 102 along a horizontal dimension (e.g., from a left side of the electronic device 102 to a right side of the electronic device 102), a waving gesture made by the user's arm rotating about an elbow, a pushing gesture made by moving the user's hand above the electronic device 102 along a vertical dimension (e.g., from a bottom side of the electronic device 102 to a top side of the electronic device 102). Other types of 3D gestures or motions may also be made, such as a reaching gesture made by moving the user's hand towards the electronic device 102, a knob-turning gesture made by curling fingers of the user's hand to grip an imaginary door knob and rotating in a clockwise or counter-clockwise fashion to mimic an action of turning the imaginary door knob, and a spindle-twisting gesture made by rubbing a thumb and at least one other finger together. Each of these example gesture types may be detected by the radar system 104. Upon detecting each of these gestures, the electronic device 102 may perform an action, such as provide a voice input trigger, activate or control a home-automation system, activate one or more sensors, open an application, control an entertainment system, light, or appliance, pin content to a screen, silence an alarm, or control a user interface. In this way, the radar system 104 provides touch-free control of the electronic device 102.

In FIG. 1, the voice input trigger is a 3D gesture in which the user 112 drops and extends an arm, as shown by an arrow 118 and a dashed-line depiction of the arm. As described with reference to FIGS. 3-6, the radar system 104 can use the radar field 110 to sense and analyze reflections from objects in the radar field 110 in ways that enable high, or increased, resolution and accuracy for both gesture recognition and body posture. Thus, the voice input trigger gesture may take forms other than that shown by the arrow 118, such as a micro-gesture or a movement of the user 112 to within a threshold distance of the electronic device 102. Further, the voice input trigger gesture may be a predefined 3D gesture, a 3D gesture selected from a list, or a custom gesture (e.g., the user may interact with the radar-based application 106 and the radar system 104 to define a unique gesture, or combination of gestures, as the voice input trigger). Unless indicated otherwise by a particular context, increased accuracy refers to an increased degree of refinement, an increased conformity to truth, or both the increased degree of refinement and the increased conformity to truth.

In some implementations, the radar-based application 106 includes, or is in communication with, a voice interface module 120. The voice interface module 120 can receive the voice input (e.g., the voice command), determine an action that corresponds to the voice input, and cause the electronic device 102 to perform the corresponding action. In some implementations, the voice interface module 120 may be used to maintain the microphone 108 in the non-operational mode. As shown in FIG. 1, the voice interface module 120 is part of the radar-based application 106, but the voice interface module 120 can be a separate entity that is part of, or separate from, the electronic device 102. In this way, the radar-based application 106 can use both the voice input and a gesture input to interact with the electronic device 102 or with another device.

Consider two examples. In the first example, once the microphone 108 enters the operational mode, the radar-based application 106 (e.g., the voice interface module 120) receives the voice command that is directed to a device that can be interacted with via the radar-based application 106. Once the voice command is received, the radar-based application 106 receives a 3D gesture that specifies a particular device. In this case, the voice command is any of a variety of commands, such as "turn lights down" or "turn speakers up" and the 3D gesture is a 3D gesture, such as a pointing gesture, that specifies which lights or a specific speaker. The radar-based application 106 can distinguish between devices in a variety of manners, such as using a virtual map of an environment in which the radar-based application 106 is operating. The virtual map may be generated using techniques such as those described below with respect to FIG. 7. In this way the 3D gesture can be used, along with the voice command, to turn on a particular light, adjust a particular speaker in a home-theater system, and so forth.

In the second example (again, once the microphone 108 enters the operational mode), the radar-based application 106, or the voice interface module 120, receives a voice command to adjust a function of a device that can be interacted with via the radar-based application 106. Once the voice command is received, the radar-based application 106 receives a 3D gesture that specifies an amount of adjustment to the function of the device. As in the first example, the voice command is any of a variety of commands, such as "turn lights down" or "turn speakers up" and the 3D gesture is a 3D gesture that adjusts the lights or speakers, such as downward hand gesture or a gesture that has a motion of turning a volume dial. Thus, the electronic device 102, along with the radar system 104 and the radar-based application 106, work together to enable users of voice interfaces to efficiently and conveniently use both voice commands and 3D gestures to make adjustments to functions of devices that can be interacted with via a voice interface.

In some implementations, including implementations of the examples described above, the 3D gesture is effective if received within a threshold time of, or approximately simultaneously with, receiving the voice command. The threshold time may be any appropriate time (e.g., 0.5, 1.5, or 2.5 seconds), and may be predefined, user-selectable, or determined via a machine learning module that is included, or associated with, the radar system 104 or the radar-based application 106.

In still other implementations, including implementations of the examples described above, the radar-based application 106 or the voice interface module 120 (again, once the microphone 108 enters the operational mode) may provide an audio message to the user. For example, in response to a gesture, voice command, or other input, the audio message may be used to request confirmation of the command. In another example, the gesture, voice command, or other input may include an instruction for the radar-based application 106 or the voice interface module 120 to provide the audio message. In some cases, however, the audio message may be incorrect, or the user may reconsider the input. The user may then use another 3D gesture to stop the audio message. The radar-based application 106 can receive the other 3D gesture, which corresponds to a command to cease providing the audio message. In response to receiving the other 3D gesture, the radar-based application 106 (or the voice interaction module 120) stops providing the audio message. The other 3D gesture may be effective if received within a duration of the audio message (e.g., while the audio message is playing), or before the audio message begins (e.g., between the input that causes the audio message and the beginning of the audio message). After the audio message is stopped, the microphone 108 may remain in the operational mode or, depending on the settings of the radar-based application 106, enter the non-operational mode.

Figure 2:
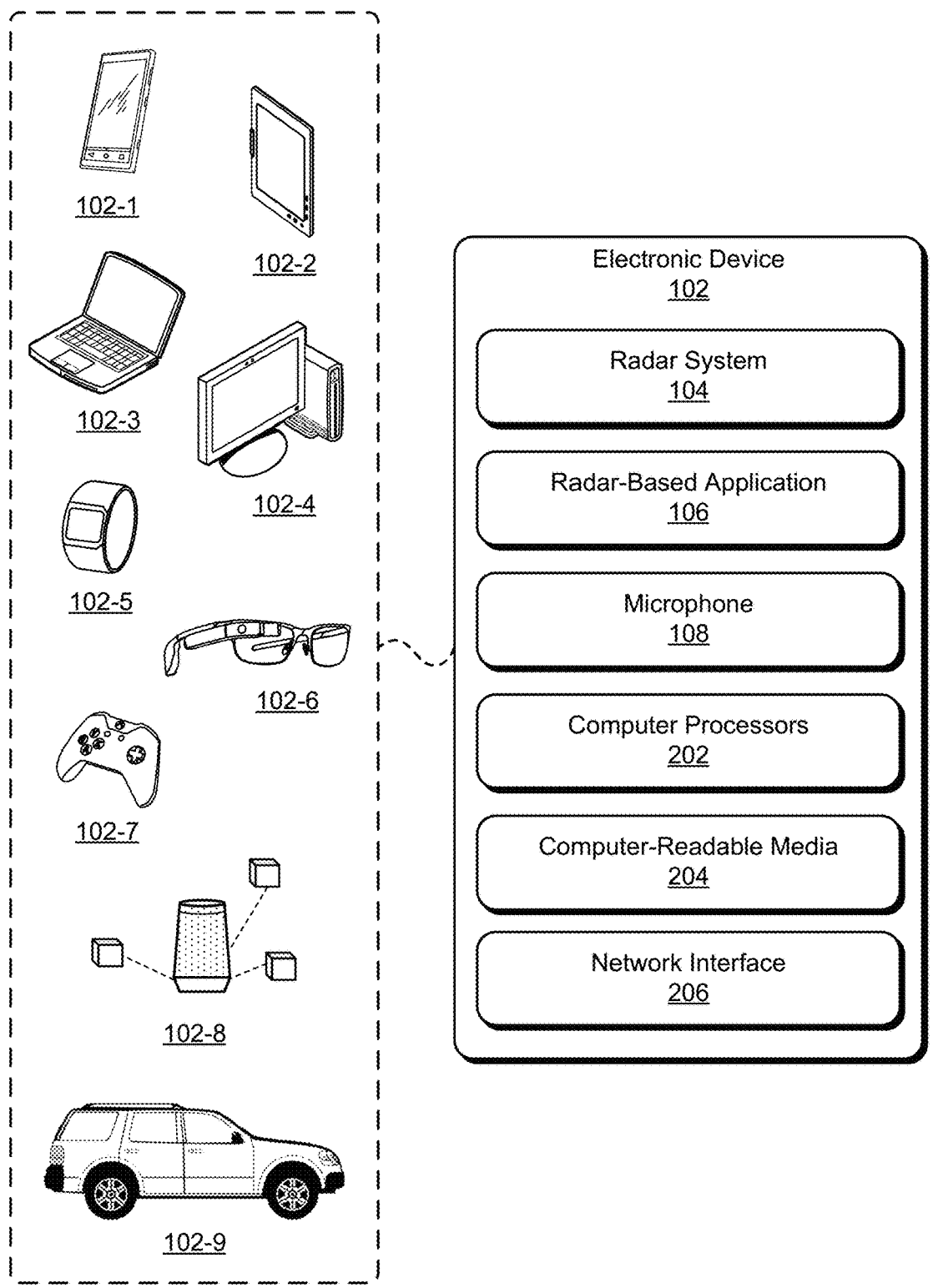
FIG. 2 illustrates an example implementation of the electronic device of FIG. 1 that includes a radar system and can implement radar-based gesture enhancement for voice interfaces.

In more detail, consider FIG. 2, which illustrates an example implementation 200 of the electronic device 102 (including the radar system 104, the radar-based application 106, and the microphone 108) that can implement radar-based gesture enhancement for voice interfaces. The electronic device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a vehicle 102-9. The electronic device 102 can also include other devices, such as televisions, entertainment systems, audio systems, drones, track pads, drawing pads, netbooks, e-readers, home security systems, and other home appliances. Note that the electronic device 102 can be wearable, non-wearable but mobile, or relatively immobile (e.g., desktops and appliances).

The electronic device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some of the functionalities described herein. The electronic device 102 may also include a network interface 206. The electronic device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. Constraints or limitations of the electronic device 102, however, may impact a design of the radar system 104. The electronic device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 is illustrated as part of the electronic device 102. In other implementations, the radar system 104 may be separate or remote from the electronic device 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 12 illustrate some of many possible environments and devices capable of employing the described techniques.

Figure 3:
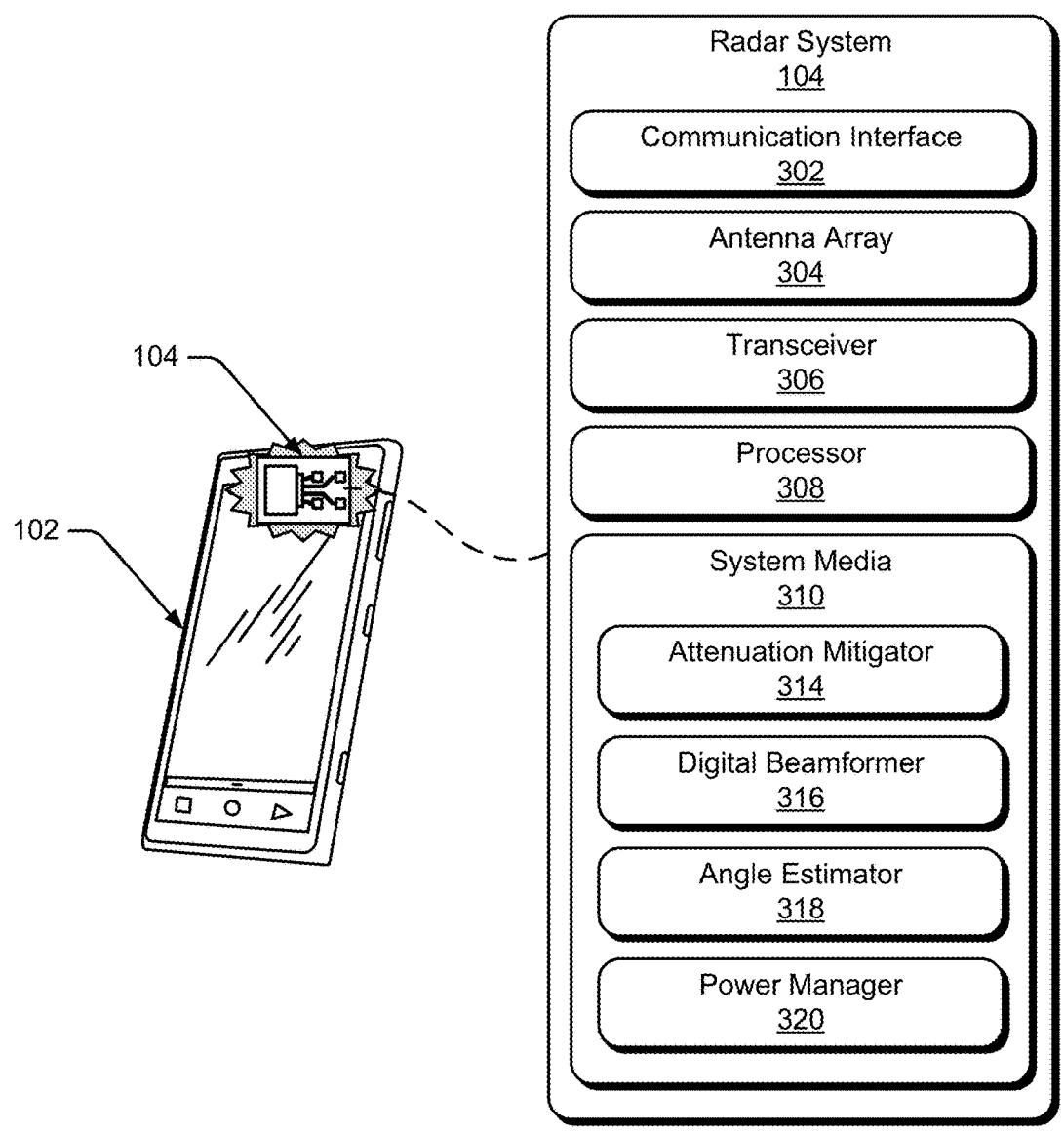
FIG. 3 illustrates an example implementation of the radar system of FIG. 2.

FIG. 3 illustrates an example implementation 300 of the radar system 104 that can be used to enable radar-based gesture enhancement for voice interfaces. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the electronic device 102) or some combination thereof. The system media 310, which may be included within, or be separate from, the computer-readable media 204 of the electronic device 102, includes one or more of the following modules: an attenuation mitigator 314, a digital beamformer 316, an angle estimator 318, or a power manager 320. These modules can compensate for, or mitigate the effects of, integrating the radar system 104 within the electronic device 102, thereby enabling the radar system 104 to recognize small or complex gestures, distinguish between different orientations of the user, continuously monitor an external environment, or realize a target false alarm rate. With these features, the radar system 104 can be implemented within a variety of different devices, such as the devices illustrated in FIG. 2.

Using the communication interface 302, the radar system 104 can provide radar data to the radar-based application 106. The communication interface 302 may be a wireless or wired interface based on the radar system 104 being implemented separate from, or integrated within, the electronic device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the radar-based application 106 for radar-based gesture enhancement for voice interfaces.

Figure 4:
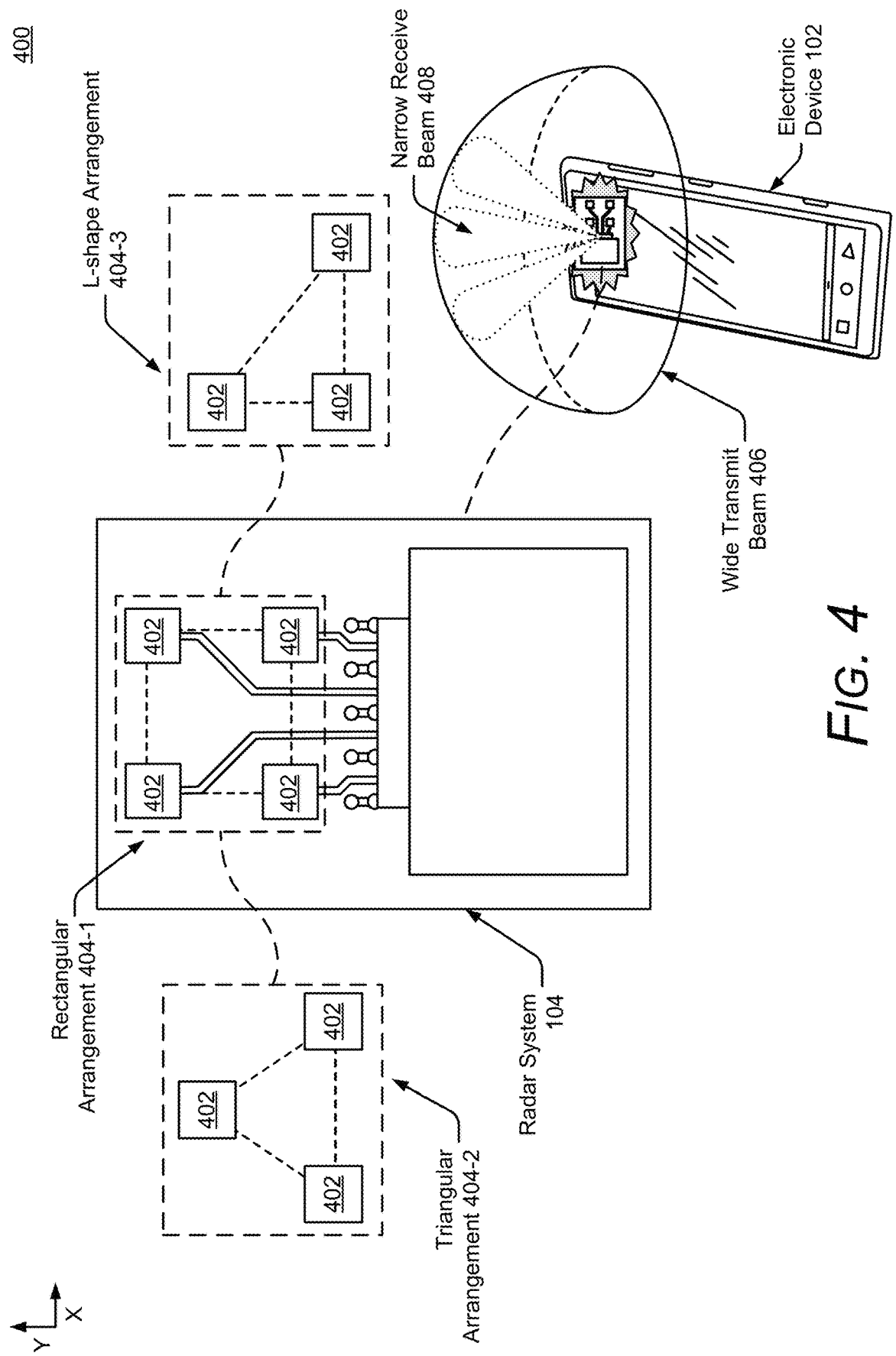
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the electronic device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

The power manager 320 enables the radar system 104 to conserve power internally or externally within the electronic device 102. Internally, for example, the power manager 320 can cause the radar system 104 to collect data using a predefined power mode or a specific duty cycle. Instead of operating at either a low-power mode or a high-power mode, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the electronic device 102. In some cases, the power manager 320 may monitor an amount of available power remaining and adjust operations of the radar system 104 accordingly. For example, if the remaining amount of power is low, the power manager 320 may continue operating at the low-power mode instead of switching to the higher power mode.

The low-power mode, for example, may use a low duty cycle on the order of a few hertz (e.g., approximately 1 Hz or less than 5 Hz), which reduces power consumption to a few milliwatts (mW) (e.g., between approximately 2 mW and 5 mW). The high-power mode, on the other hand, may use a high duty cycle on the order of tens of hertz (Hz) (e.g., approximately 20 Hz or greater than 10 Hz), which causes the radar system 104 to consume power on the order of several milliwatts (e.g., between approximately 8 mW and 20 mW). While the low-power mode can be used to monitor the external environment or detect an approaching user, the power manager 320 may switch to the high-power mode if the radar system 104 determines the user is starting to perform a gesture. Different triggers may cause the power manager 320 to switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the electronic device 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Additionally, the power manager 320 can control the use of different hardware components within the radar system 104 to conserve power. If the processor 308 comprises a low-power processor and a high-power processor (e.g., processors with different amounts of memory and computational capability), for example, the power manager 320 can switch between utilizing the low-power processor for low-level analysis (e.g., detecting motion, determining a location of a user, or monitoring the environment) and the high-power processor for situations in which high-fidelity or accurate radar data is requested by the radar-based application 106 (e.g., for gesture recognition or user orientation).

In addition to the internal power-saving techniques described above, the power manager 320 can also conserve power within the electronic device 102 by activating or deactivating other external components or sensors that are within the electronic device 102. These external components may include speakers, a camera sensor, a global positioning system, a wireless communication transceiver, a display, a gyroscope, or an accelerometer. Because the radar system 104 can monitor the environment using a small amount of power, the power manager 320 can appropriately turn these external components on or off based on where the user is located or what the user is doing. In this way, the electronic device 102 can seamlessly respond to the user and conserve power without the use of automatic shut-off timers or the user physically touching or verbally controlling the electronic device 102.

Figure 5:
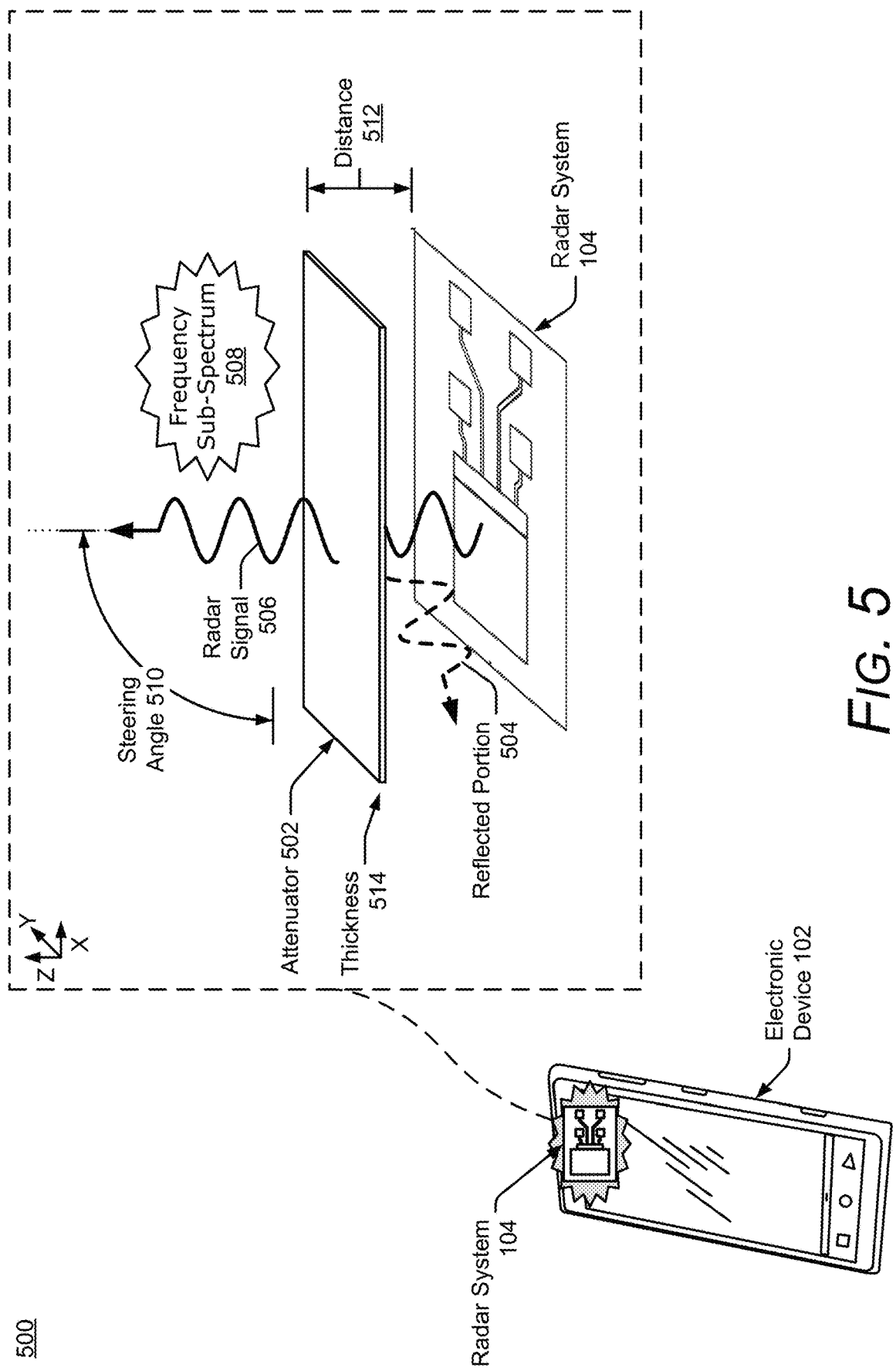
FIG. 5 illustrates additional details of an example implementation of the radar system of FIG. 2.

FIG. 5 illustrates additional details of an example implementation 500 of the radar system 104 within the electronic device 102. In the example 500, the antenna array 304 is positioned underneath an exterior housing of the electronic device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the electronic device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the electronic device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
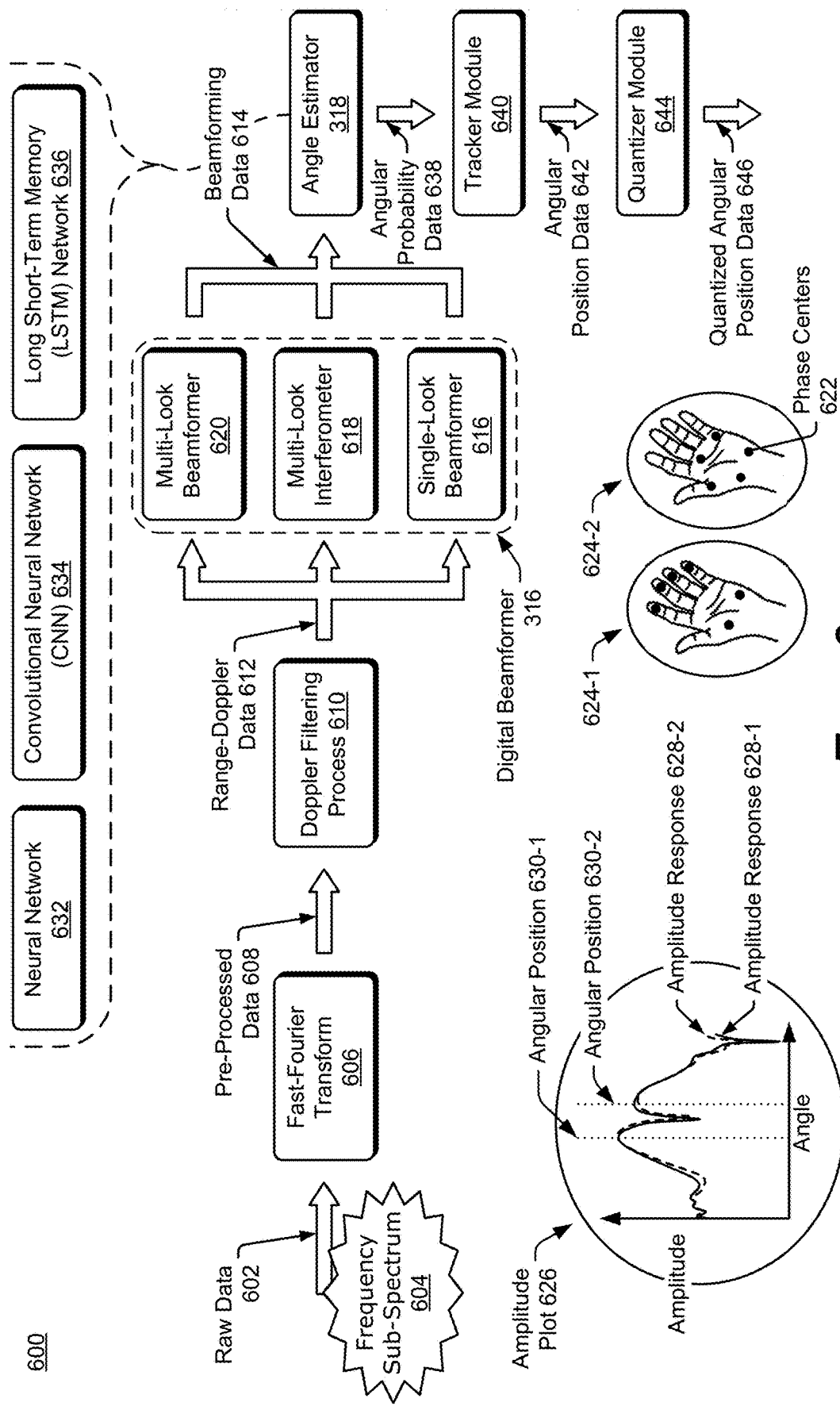
FIG. 6 illustrates an example scheme that can be implemented by the radar system of FIG. 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices 102 and radar-based applications 106, and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of electronic device 102 (e.g., computational capability or power constraints) or a target angular resolution for the radar-based application 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the electronic device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the radar-based application 106. In some situations, fewer quantization levels can be used such that the quantized angular position data 646 indicates whether the target is to the right or to the left of the electronic device 102 or identifies a 90-degree quadrant the target is located within. This may be sufficient for some radar-based applications 106, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications 106, such as gesture recognition. In some implementations, the digital beamformer 316, the angle estimator 318, the tracker module 640, and the quantizer module 644 are together implemented in a single machine learning module.

These and other capabilities and configurations, as well as ways in which entities of FIG. 1-6 act and interact, are set forth below. The described entities may be further divided, combined, used along with other sensors or components, and so on. In this way, different implementations of the electronic device 102, with different configurations of the radar system 104 and non-radar sensors, can be used to implement radar-based gesture enhancement for voice interfaces. The example operating environment 100 of FIG. 1 and the detailed illustrations of FIGS. 2-6 illustrate but some of many possible environments and devices capable of employing the described techniques.

Example Systems

As noted with respect to FIG. 1, the techniques and systems described herein can also enable the electronic device 102 to generate and use a virtual map of an environment in which the electronic device 102 is operating. The virtual map allows the electronic device 102 to distinguish between one or more devices in the environment that can be interacted with using a voice interface.

Figure 7:
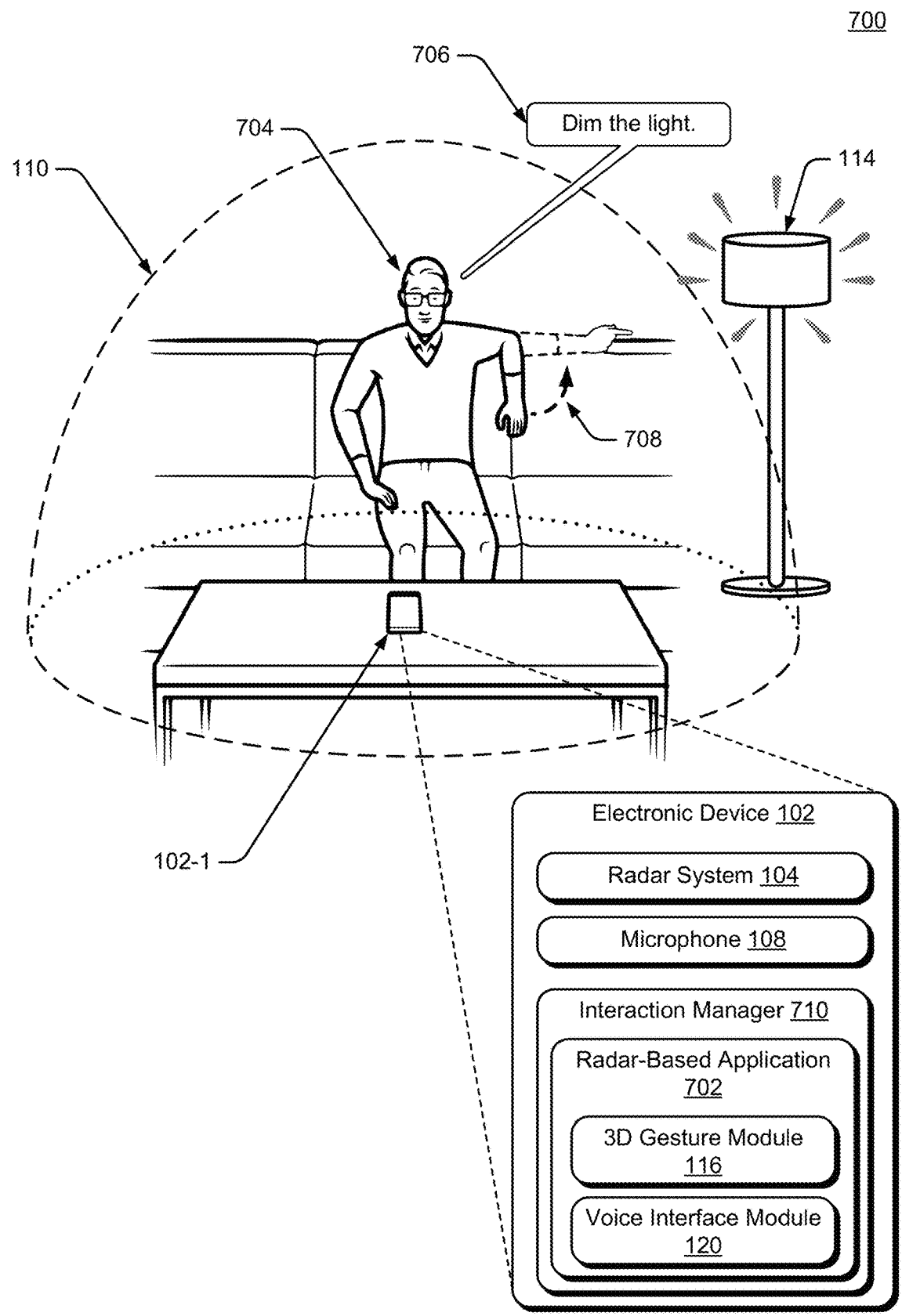
FIG. 7 illustrates another example environment in which techniques enabling radar-based gesture enhancement for voice interfaces can be implemented.

FIG. 7 illustrates another example environment 700 in which techniques enabling radar-based gesture enhancement for voice interfaces can be implemented. The example operating environment 700 includes the electronic device 102, which includes, or is associated with, the radar system 104, the microphone 108, and a radar-based application 702. In the example environment 700, the radar system 104 provides the radar field 110 as described above with reference to FIGS. 1-6. The radar system 104 also enables the electronic device 102, in this case the smartphone 102-1, to sense and analyze reflections from an object 704 in the radar field 110. As shown in FIG. 7, the object 704 is a person or a user of the smartphone 102-1 (person 704 or user 704), but the object 704 may be any of a variety of objects that the radar system 104 can sense and analyze reflections from, such as wood, plastic, metal, fabric, or organic material (e.g., the user 704). Based on the analysis of the reflections, the radar system 104 can provide radar data as described above with reference to FIGS. 1-6 and may pass the radar data to other entities, such as the radar-based application 702.

The radar-based application 702 may be any of a variety of radar-based applications that can receive voice commands or instructions, such as the radar-based application 106. In some implementations, the radar-based application 702 may also include a voice interface module, such as the voice interface module 120, to receive and process voice commands. The radar-based application 702 can use the voice commands or instructions to interact with the electronic device 102 or with a variety of other devices, such as home appliances, security systems, entertainment systems, lights (e.g., the lamp 114), or an internet-of-things (TOT) device. The radar-based application 702 may include a 3D gesture module, such as the 3D gesture module 116, which can be used to determine, at least in part, 3D gestures based on the radar data and actions that correspond to the 3D gestures.

The radar-based application 702 can also generate and store (e.g., in a memory device included or associated with the electronic device 102) a virtual map of an environment. The environment may be a room, a building, or another environment. The virtual map identifies a location and a type of one or more devices in the environment that can be interacted with via the radar-based application. For example, the virtual map for the environment 700 may include a type of device (e.g., the lamp 114, which may be dimmable or not dimmable) and a location of the lamp 114 in the environment 700. The virtual map may also include a location for one or more types of speakers (e.g., left-, right-, and center-channel speakers) or media devices (e.g., the location of a stereo, a video player, or a satellite receiver box).

The virtual map may be generated by any of a variety of entities, such as the radar-based application 702, the radar system 104, or the radar-based application 106. In some implementations, the electronic device 102 includes an image-capture device (e.g., a video camera) and the radar-based application 702 may generate the virtual map based on a scan of the environment by the image-capture device. The scan may be performed manually by the user 704 or automatically by the electronic device 102. For example, the user can move the image-capture device around to scan the room for devices that can be interacted with via the radar-based application 702 or the image-capture device can be integrated with the electronic device 102 and perform the scan automatically. The image-capture device may enter a non-operational mode when the scan is complete, such as by a manual shutoff by the user 704 or, in response to a determination that the image-capture device has stopped moving, the image-capture can automatically enter the non-operational mode. In the case of automatic entry in the non-operational mode, the image capture device may remain operation for a threshold period of time after the determination that it has stopped moving (e.g., 1, 3, or 5 seconds).

In other implementations, the radar-based application 702 (or another entity) may generate the virtual map by receiving an identification signal from the devices that can be interacted with by the radar-based application 702. The identification signal includes the location and the type of the devices, and may also include other information related to the interactions, such as device settings and signal strength. The radar-based application 702 can generate the virtual map using the location of the electronic device 102 and the information in the identification signal. In some cases, the locations may be determined using various position determination techniques, such as received signal strength indication (RSSI), fingerprinting, angle of arrival (AoA) and time of flight (ToF) based techniques, along with trilateration or triangulation algorithms. The identification signal may be received over a network, including any of the networks described with reference to FIGS. 2-6 and 13.

In yet other implementations, the radar-based application 702 (or another entity) may generate the virtual map by receiving input from the user 704 that identifies the devices that can be interacted with by the radar-based application. For example, the user 704 can manually input the location and the type of the devices that can be interacted with by detecting the devices with the radar-based application 702 and then touching or pointing at selected devices and providing information such as the type (overhead light, floor lamp, main speakers, and so forth). The input may include text input or voice input.

The radar-based application 702 can enable the user 704 to interact with the devices using a combination of voice and gesture commands. For example, the radar-based application 702, or the voice interface module 120, can receive a voice command (e.g., via the microphone 108), directed to at least one of the identified devices, that includes at least the type of the device. Once the voice command is received, the radar-based application 702 can determine, based on the radar data, a 3D gesture that corresponds to a sub-command that is directed to the same devices as the voice command and is related to the voice command. The sub-command is a command that is related to the voice command by adding to, restricting, directing, fine-tuning, or otherwise modifying or supplementing the voice command. In response to both the voice command and the 3D gesture, the radar-based application 702 causes the device, or devices, to perform an action that corresponds to the voice command and the sub-command.

For example, the user 704 can give a voice command, shown in FIG. 7 as a text bubble (voice command 706), to "Dim the light." After, or at approximately a same time as, giving the voice command 706, the user 704 can provide a 3D gesture, shown in FIG. 7 by a dashed-line arrow (3D gesture 708), indicating which light to dim. In FIG. 7, the 3D gesture 708 is a rotation of the user's 704 arm up to point at the lamp 114. Using the virtual map, as described in this document, the radar-based application 702 can determine that the user 704 intends to dim the lamp 114. Thus, in this example, the sub-command corresponding to the 3D gesture 708 specifies, based on the identified location, a particular one of the devices that can be interacted with.

In another example, the voice command is a command to adjust a function of at least one of the identified devices, and the sub-command that corresponds to the 3D gesture specifies an amount of adjustment to the function of the identified device. For example, the voice command may be "turn the center-channel speaker down." The 3D gesture may be the user 704 grasping a virtual dial and rotating the dial in a direction that reduces the volume of the center-channel speaker (e.g., in proportion to an amount of rotation).

In some implementations, including any of the examples described above, the radar-based application 702 may be included in, or be in communication with, an interaction manager 710. The interaction manager 710 can be any of a variety of controllers, modules, or managers that can control or coordinate the functions of the radar-based application 702, the 3D gesture module 116, and the voice interface module 120. As shown in FIG. 7, the interaction manager 710 is integrated with the electronic device 102. In other implementations, however, the electronic device 102, the interaction manager 710. The radar-based application 702, the 3D gesture module 116, and the voice interface module 120 may be separate from each other or combined in a variety of manners.

In still other implementations, including any of the examples described above, the 3D gesture (sub-command) is effective if received after the voice command. In other implementations, the 3D gesture may be effective if received either later than, or at approximately a same time as, the voice command. In this way, the described techniques enable the user 704 to use a simple voice command, along with a natural gesture, to quickly and easily perform a task.

Example Methods

Figure 8:
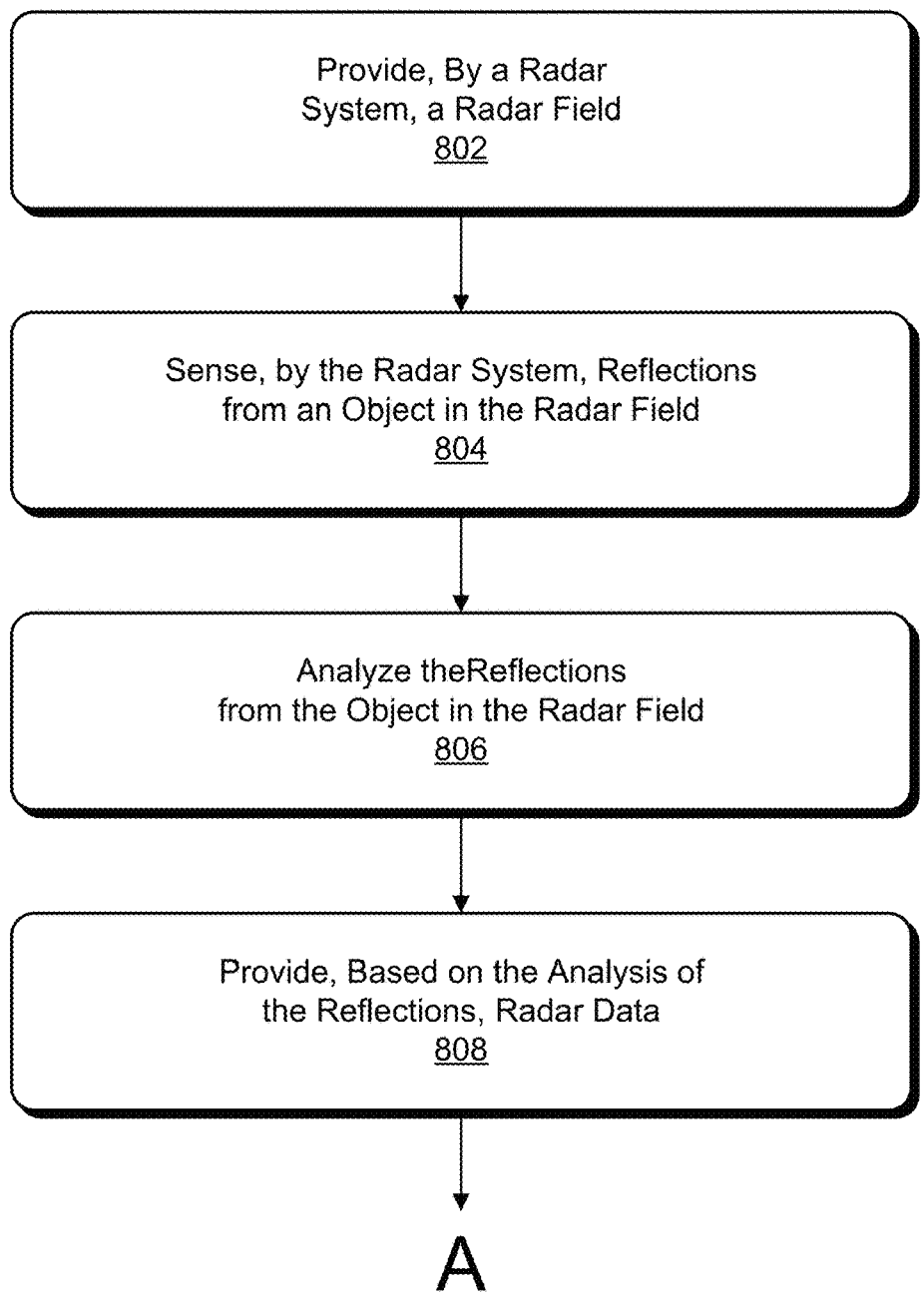
FIGS. 8 and 9 depict an example method enabling radar-based gesture enhancement for voice interfaces.
Figure 9:
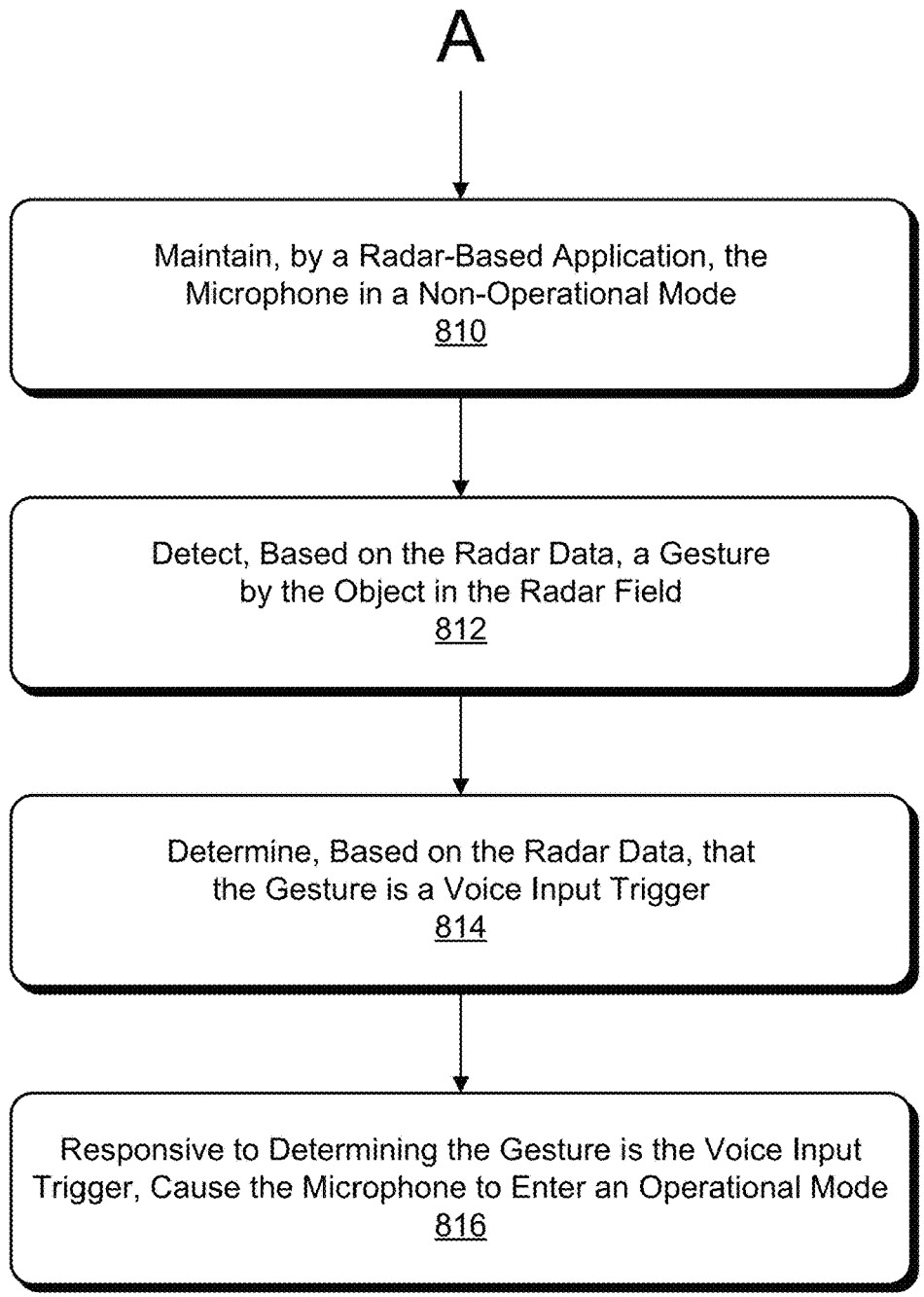

FIGS. 8 and 9 depict an example method 800 enabling radar-based gesture enhancement for voice interfaces. The method 800 can be performed with an electronic device that includes a microphone and uses a radar system to provide a radar field. The radar field is used to detect a 3D gesture by an object in the radar field and determine that the 3D gesture is a voice input trigger that causes the microphone to exit a non-operational mode and enter an operational mode. The method 800 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-7, reference to which is made for example only. The techniques are not limited to performance by one entity or multiple entities operating on one device.

At 802, a radar field is provided. This radar field can be provided by any of a variety of electronic devices (e.g., the electronic device 102 described above), that include a microphone (e.g., the microphone 108), a radar system (e.g., the radar system 104), and a radar-based application (e.g., the radar-based applications 106 or 702, including the voice interface module 120). Further, the radar field may be any of a variety of types of radar fields, such as the radar field 110 described above.

At 804, reflections from an object in the radar field are sensed by the radar system. The object may be any of a variety of objects, such as wood, plastic, metal, fabric, or organic material. For example, the object may be a person or a body part of a person (e.g., a hand), such as the objects 112 or 704 as described above.

At 806, the reflections from the object in the radar field are analyzed. The analysis may be performed by any of a variety of entities (e.g., the radar system 104 or any of the radar-based applications described herein) and may include various operations or determinations, such as those described with reference to FIGS. 3-6.

At 808, based on the analysis of the reflection, radar data, such as the radar data described above, is provided. The radar data may be provided by any of a variety of entities, such as the radar system 104 or any of the radar-based applications described herein. In some implementations, the radar system may provide the radar data and pass the radar data to other entities (e.g., any of the described radar-based applications, interaction managers, or voice interface modules). The description of the method 800 continues in FIG. 9, as indicated by the letter "A" after block 808 of FIG. 8, which corresponds to the letter "A" before block 810 of FIG. 9.

At 810, the radar-based application maintains the microphone in a non-operational mode. As noted with reference to FIG. 1, the non-operational mode can be a mode in which the microphone is powered off and cannot receive, analyze, or record audio input. In other implementations, the non-operational mode may be a mode in which the microphone is connected to power and can receive audio input, but cannot be used to record, analyze, or otherwise act on the audio input. As noted, the powered non-operational mode may be achieved using various methods (e.g., a software or firmware control signal or a hardware control, such as a switch) that prohibit data transfer from the microphone 108 to memory devices, processors, or other devices.

At 812, based on the radar data, the radar-based application detects a 3D gesture by the object in the radar field. As noted, a 3D gesture is a gesture that comprises one or more movements, in any direction, within a 3D space illuminated by the radar field.

At 814, the radar-based application determines, based on the radar data, that the 3D gesture is a voice input trigger. In some implementations, the radar-based application can detect the 3D gesture, and make the determination that the 3D gesture is the voice input trigger, using a 3D gesture module (e.g., the 3D gesture module 116). As noted, the voice input trigger is an indication to the radar-based application that it may receive voice input (or voice commands). As described with reference to FIGS. 3-6, the radar system can use the radar field to sense and analyze reflections from objects in the radar field 110 in ways that enable high, or increased, resolution and accuracy for both 3D gesture recognition and body posture. Thus, the voice input trigger gesture may take a variety of forms, such as a 3D hand gesture, a micro-gesture, or a movement of the object in the radar field to within a threshold distance of the electronic device. As noted with reference to FIG. 1, the voice input trigger gesture may be a predefined 3D gesture, a 3D gesture selected from a list, or a custom gesture. Unless indicated otherwise by a particular context, increased accuracy refers to an increased degree of refinement, an increased conformity to truth, or both the increased degree of refinement and the increased conformity to truth.

At 816, in response to determining that the 3D gesture is the voice input trigger, the radar-based application causes the microphone to enter an operational mode that enables the microphone to receive, analyze, and act on, voice commands or other audio input. In some implementations, the radar-based application can also cause the microphone to enter, or re-enter, the non-operational mode when the radar-based application does not receive a voice or other audio input within a threshold time of receiving the voice input trigger.

Figure 10:
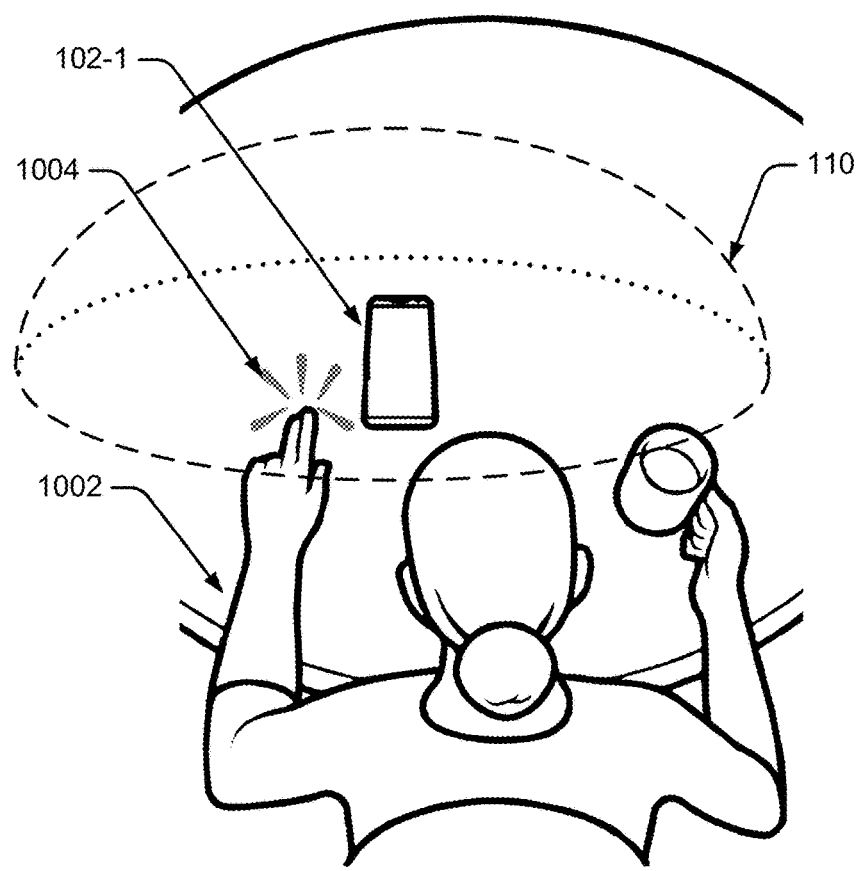
FIG. 10 illustrates an example implementation of an electronic device that can implement additional details of the method of FIGS. 8 and 9.

Consider, for example, FIG. 10, which illustrates an example implementation 1000 of an electronic device that can implement additional details of the method 800. FIG. 10 depicts the electronic device (in this case, the smartphone 102-1), including the radar system, which is providing the radar field 110, the radar-based application, and the microphone. In the example implementation 1000, assume that the radar-based application is maintaining the microphone in the non-operational mode when a user 1002 makes a tapping gesture 1004 on a surface of a table near the electronic device. The radar-based application, based on the radar data, determines that the gesture 1004 is the voice input trigger and causes the microphone to enter the operational mode. Without having to first touch or speak to the smartphone 102-1, the user 1002 can now use voice commands to interact with the smartphone 102-1 and with other devices that are subject to control by the radar-based application.

As noted, in some implementations of the method 800, the radar-based application includes, or is communication with, a voice interface module (e.g., the voice interface module 120). The voice interface module can receive a voice input (e.g., a voice command), determine an action that corresponds to the voice input, and cause the electronic device to perform the corresponding action. The voice interface module may also be used to maintain the microphone in the non-operational mode. The voice interface module may be integrated with the radar-based application, or be a separate entity that is part of, or separate from, the electronic device 102. In this way, the radar-based application is enabled to use both a voice command and a gesture input to interact with another device.

For example, once the microphone enters the operational mode, the radar-based application (e.g., the voice interface module 120) can receive a voice command that is directed to a device that can be interacted with by the radar-based application. Once the voice command is received, the radar-based application can receive a 3D gesture that specifies a particular device. To be effective, the 3D gesture is received within a threshold time of, or approximately simultaneously with, receiving the voice command (e.g., the threshold time may be 0.5, 1.5, or 2.5 seconds). The voice command can be any of a variety of commands, such as "turn lights down" or "turn speakers up." The 3D gesture is a 3D gesture, such as a pointing gesture, that specifies which lights to turn down or a specific speaker to turn up. The radar-based application can distinguish between devices in a variety of manners, such as by using a virtual map of an environment in which the radar-based application is operating, as described with reference to FIG. 7.

Figure 11:
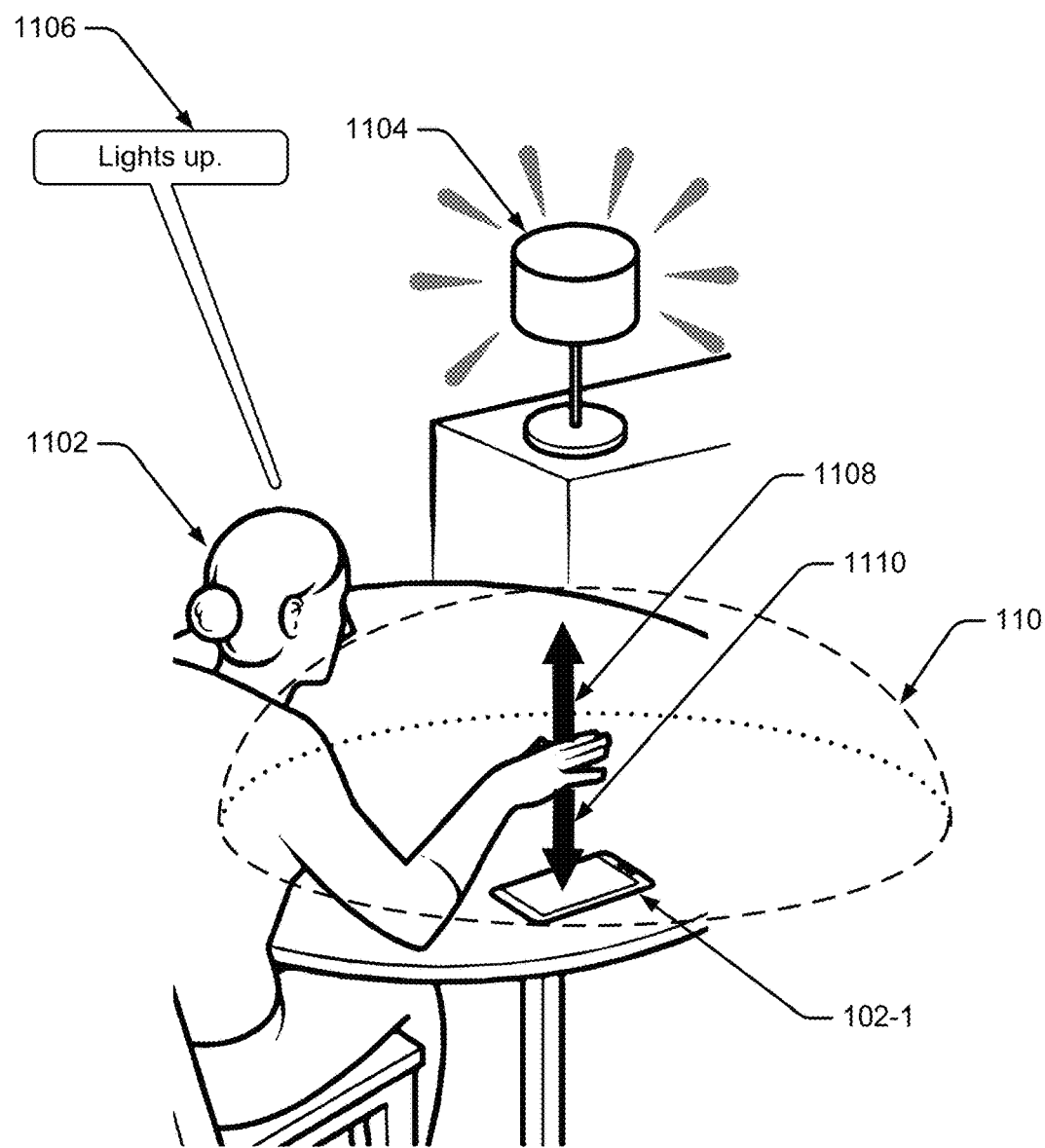
FIGS. 11 and 12 illustrate additional details of the method of FIGS. 8 and 9.

By way of further example, consider FIG. 11, which illustrates an example implementation 1100 that describes additional details regarding the method 800. In the example implementation 1100, a user 1102 is interacting with the electronic device 102 (in this case, the smartphone 102-1), and the radar system is providing the radar field 110. Assume, for this example, that the microphone has already entered the operational mode, as described above. The radar-based application (e.g., the voice interface module 120) can now receive voice commands from the user 1102 to adjust a function of a device that can be interacted with via the radar-based application, such as a lamp 1104. For example, the user can provide a voice command 1106, such as "lights up" (shown in FIG. 11 as a text balloon), to increase a brightness of the lamp 1104. Once the voice command 1106 is received, the radar-based application can receive a 3D gesture that specifies an amount of adjustment to the function of the device. In FIG. 11, the 3D gesture is an upward hand gesture, as indicated by a directional arrow 1108. As noted in the previous example, effective, the 3D gesture is received within a threshold time of, or approximately simultaneously with, receiving the voice command (e.g., the threshold time may be 0.5, 1.5, or 2.5 seconds).

Note that the user 1102 may continue to adjust the brightness of the lamp 1104 by continuing the upward gesture to keep increasing the brightness or by a downward gesture (as shown by an arrow 1110) to decrease the brightness. Thus, the electronic device 102, along with the radar system and the radar-based application, work together to enable users of voice interfaces to efficiently and conveniently use both voice commands and 3D gestures to make adjustments to functions of devices that can be interacted with via a voice interface.

Figure 12:
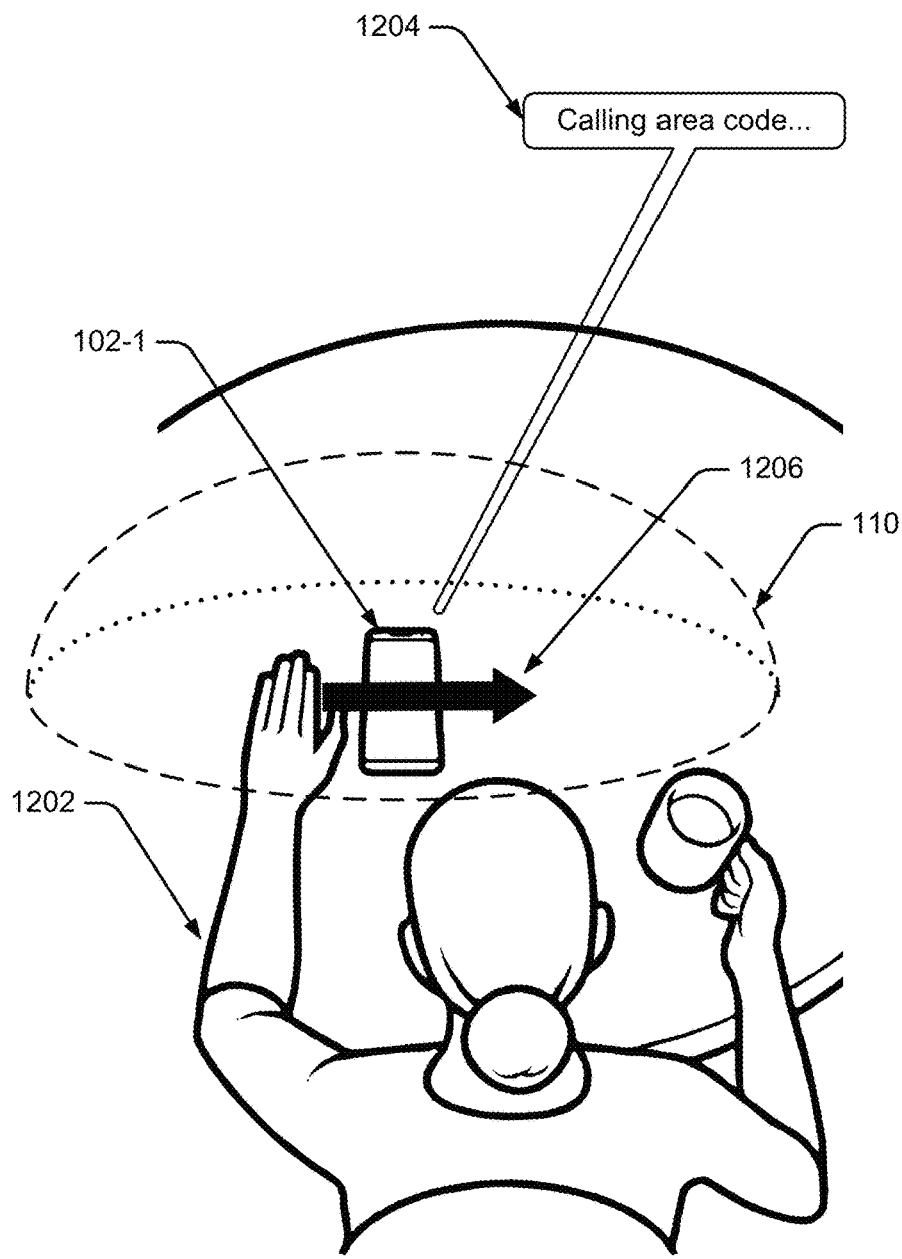

Consider another example, shown in FIG. 12, which illustrates an example implementation 1200 that describes additional details regarding the method 800. In the example implementation 1200, a user 1202 is interacting with the smartphone 102-1, and the radar system is providing the radar field 110. Assume, for this example, that the microphone has already entered the operational mode and, in response to a voice command or other event (e.g., a scheduled meeting reminder), the radar-based application, or the voice interface module 120, is providing an audio message 1204 (shown as a text balloon). In the example implementation 1200, the audio message 1204 is a notification ("Calling area code . . . ") that the smartphone 102-1 is placing, or is about to place, a phone call. Further assume that the user 1202 does not want to hear the audio message 1204, and provides a 3D gesture that corresponds to a command to stop the audio message 1204. In the example implementation 1200, the 3D gesture is a right-to-left swipe near the smartphone 102-1, as shown by an arrow 1206 (3D gesture 1206). When the radar-based application receives the 3D gesture 1206, the audio message is stopped.

The 3D gesture 1206 may be effective if received within a duration of the audio message (e.g., while the audio message is playing), or before the audio message begins (e.g., between the input that causes the audio message and the beginning of the audio message). After the audio message is stopped, the microphone may remain in the operational mode or, depending on the settings of the radar-based application, enter the non-operational mode. In implementations in which the microphone remains in the operational mode, the user 1202 may provide additional voice commands. In this way, the user 1202 can correct the radar-based application if, for example, the audio message 1204 is incorrect, or provide a different or additional voice command.

It should be noted that these techniques for radar-based gesture enhancement for voice interfaces may be more secure than other techniques. Not only are 3D gestures (especially user-defined gestures, micro-gestures, and posture- or position-based gestures) not typically obtainable by an unauthorized person (unlike, for example, a password), but also because a radar image of the user, even if it includes the user's face, does not visually identify the user like a photographic or video does. Even so, further to the descriptions above, the user may be provided with controls allowing the user to make an election as to both whether and when any of the systems, programs, modules, or features described in this document may enable collection of user information (e.g., information about a user's social network, social actions or activities, profession, a user's preferences, or a user's current location), and whether the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to or about the user.

Example Computing System

Figure 13:
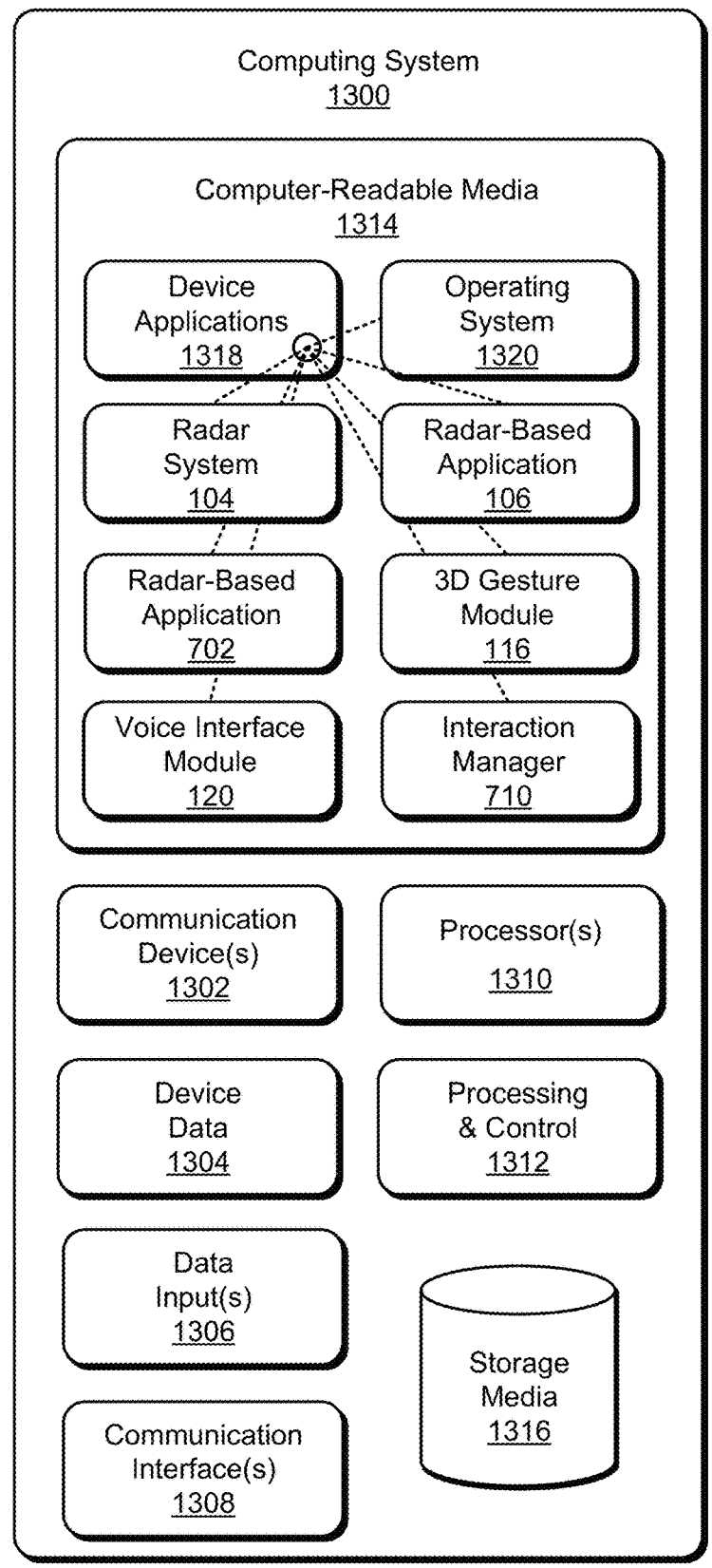
FIG. 13 illustrates various components of an example computing system that can be implemented as any type of client, server, and/or electronic device as described with reference to FIGS. 1-12 to implement, or in which techniques may be implemented that enable, radar-based gesture enhancement for voice interfaces.

FIG. 13 illustrates various components of an example computing system 1300 that can be implemented as any type of client, server, and/or electronic device as described with reference to the previous FIGS. 1-12 to implement radar-based gesture enhancement for voice interfaces.

The computing system 1300 includes communication devices 1302 that enable wired and/or wireless communication of device data 1304 (e.g., radar data, 3D gesture data, authentication data, reference data, received data, data that is being received, data scheduled for broadcast, data packets of the data). The device data 1304 or other device content can include configuration settings of the device, media content stored on the device, and/or information associated with a user of the device (e.g., an identity of a person within a radar field). Media content stored on the computing system 1300 can include any type of radar, biometric, audio, video, and/or image data. The computing system 1300 includes one or more data inputs 1306 via which any type of data, media content, and/or inputs can be received, such as human utterances, interactions with a radar field, touch inputs, user-selectable inputs (explicit or implicit), messages, music, television media content, recorded video content, and any other type of audio, video, and/or image data received from any content and/or data source. The data inputs 1306 may include, for example, the radar based applications 106 and 702, the 3D gesture module 116, or the voice interface module 120.

The computing system 1300 also includes communication interfaces 1308, which can be implemented as any one or more of a serial and/or parallel interface, a wireless interface, any type of network interface, a modem, and as any other type of communication interface. The communication interfaces 1308 provide a connection and/or communication links between the computing system 1300 and a communication network by which other electronic, computing, and communication devices communicate data with the computing system 1300.

The computing system 1300 includes one or more processors 1310 (e.g., any of microprocessors, controllers, or other controllers) that can process various computer-executable instructions to control the operation of the computing system 1300 and to enable techniques for, or in which can be implemented, radar-based gesture enhancement for voice interfaces. Alternatively or additionally, the computing system 1300 can be implemented with any one or combination of hardware, firmware, or fixed logic circuitry that is implemented in connection with processing and control circuits, which are generally identified at 1312. Although not shown, the computing system 1300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1300 also includes computer-readable media 1314, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1300 can also include a mass storage media device (storage media) 1316.

The computer-readable media 1314 provides data storage mechanisms to store the device data 1304, as well as various device applications 1318 and any other types of information and/or data related to operational aspects of the computing system 1300. For example, an operating system 1320 can be maintained as a computer application with the computer-readable media 1314 and executed on the processors 1310. The device applications 1318 may include a device manager, such as any form of a control application, software application, signal-processing and control modules, code that is native to a particular device, an abstraction module, a gesture recognition module, and other modules. The device applications 1318 may also include system components, engines, or managers to implement radar-based gesture enhancement for voice interfaces, such as the radar system 104, the radar-based application 106, the radar-based application 702, the 3D gesture module 116, the voice interface module 120, or the interaction manager 710. The computing system 1300 may also include, or have access to, one or more machine learning systems.

CONCLUSION

Although implementations of techniques for, and apparatuses enabling, radar-based gesture enhancement for voice interfaces have been described in language specific to features and/or methods, it is to be understood that the subject of the appended claims is not necessarily limited to the specific features or methods described. Rather, the specific features and methods are disclosed as example implementations enabling radar-based gesture enhancement for voice interfaces.

What is claimed is:

1. An electronic device, comprising:
a microphone;
a radar system, implemented at least partially in hardware, configured to:
provide a radar field;
sense reflections from an object in the radar field;
analyze the reflections from the object in the radar field; and
provide, based on the analysis of the reflections, radar data;
one or more computer processors; and
one or more computer-readable media having instructions stored thereon that, responsive to execution by the one or more computer processors, implement a radar-based application configured to:
maintain the microphone in a non-operational mode, the non-operational mode comprising a mode in which audio input received by the microphone cannot be recorded or acted upon;
detect, based on the radar data, a gesture by the object in the radar field;
determine, based on the radar data, that the gesture is a voice input trigger; and
responsive to determining the gesture is the voice input trigger, cause the microphone to enter an operational mode.

2. The electronic device of claim 1, wherein:
the object in the radar field is a user; and
the voice input trigger is a three-dimensional (3D) gesture by the user.

3. The electronic device of claim 1, wherein the radar-based application is further configured to cause, responsive to not receiving a voice input within a threshold time of receiving the voice input trigger, the microphone to enter the non-operational mode.

4. The electronic device of claim 1, wherein:
the electronic device further comprises a voice interface module that is configured, responsive to the microphone entering the operational mode, to receive, at a first time, a voice command, the voice command being a command directed to a device that can be interacted with via the radar-based application; and
the radar-based application is further configured to receive, at a second time that is later than the first time and within a threshold time of the voice interface module receiving the voice command, a 3D gesture that specifies a particular device to which the voice command is directed.

5. The electronic device of claim 1, wherein:
the electronic device further comprises a voice interface module that is configured, responsive to the microphone entering the operational mode, to receive, at a first time, a voice command, the voice command being a command to adjust a function of a device that can be interacted with via the radar-based application; and
the radar-based application is further configured to receive, at a second time that is later than the first time and within a threshold time of the voice interface module receiving the voice command, a 3D gesture that specifies an amount of adjustment to the function of the device that can be interacted with via the radar-based application.

6. The electronic device of claim 1, wherein the radar-based application is further configured, responsive to the microphone entering the operational mode, to:
provide an audio message;
receive, within a duration of the audio message, another 3D gesture, the other 3D gesture corresponding to a command to cease providing the audio message; and
responsive to receiving the other 3D gesture, cease providing the audio message.

7. The electronic device of claim 1, wherein the radar system further comprises a digital beamformer and an angle estimator, and the radar system is configured to monitor angles in a field of view between approximately −90 degrees and approximately 90 degrees.

8. The electronic device of claim 1, wherein the electronic device comprises:
a tablet computing device;
a wearable computing device;
a smartphone;
a home appliance; or
a home-automation system.

9. The electronic device of claim 1, wherein the non-operational mode further comprises the microphone being powered off.

10. The electronic device of claim 1, wherein the non-operational mode further comprises the microphone being powered on, and the electronic device further comprises a control mechanism configured to prohibit the microphone from transmitting the audio input or data based on the audio input.

11. The electronic device of claim 10, wherein the control mechanism further comprises:
a software control signal;
a firmware control signal;
a switch;
a non-switch hardware control, or
combinations thereof.

12. A system, comprising:
an electronic device;
a microphone;
a radar system, implemented at least partially in hardware, configured to:
provide a radar field;
sense reflections from an object in the radar field;
analyze the reflections from the object in the radar field; and
provide, based on the analysis of the reflections, radar data;
one or more computer processors; and
one or more computer-readable media having instructions stored thereon that, responsive to execution by the one or more computer processors, implement an interaction manager configured to:
generate and store a virtual map of an environment, the virtual map comprising a location and a type of one or more devices in the environment that can be interacted with via the interaction manager;
receive, at a first time, a voice command directed to at least one identified device, the voice command including at least the type of the at least one identified device;
determine, at a second time that is later than, or at approximately a same time as, the first time, a three-dimensional (3D) gesture, the determination based on the radar data, the 3D gesture corresponding to a sub-command, the sub-command related to the voice command; and responsive to the voice command and the 3D gesture, cause the at least one identified device to perform an action corresponding to the voice command and the sub-command.

13. The system of claim 12, wherein:
the electronic device includes an image-capture device; and
the interaction manager is further configured to:
generate the virtual map based on a scan of the environment by the image-capture device; and
responsive to a determination that the image-capture device has stopped moving, cause the image-capture device to enter a non-operational mode.

14. The system of claim 12, wherein the interaction manager is further configured to generate the virtual map by:
receiving, from the identified devices, an identification signal, the identification signal including the location and the type of the identified devices; or
receiving, via input from a user, identification of the identified devices, the identification including the location and the type of the identified devices.

15. The system of claim 12, wherein:
the sub-command specifies, based on the identified location, a particular one of the at least one identified devices; or
the voice command is a command to adjust a function of the at least one identified device and the sub-command specifies an amount of adjustment to the function of the at least one identified device; or
the sub-command is a command that adds to, restricts, directs, or fine-tunes the voice command.

16. The system of claim 12, wherein the electronic device comprises:
a tablet computing device;
a wearable computing device;
a smartphone;
a home appliance; or
a home-automation system.

17. A method implemented in an electronic device that includes a radar system, a radar-based application, and a microphone, the method comprising:
providing, by the radar system, a radar field;
sensing, by the radar system, reflections from an object in the radar field;
analyzing the reflections from the object in the radar field;
providing, based on the analysis of the reflections, radar data;
maintaining, by the radar-based application, the microphone in a non-operational mode, the non-operational mode comprising a mode in which audio input received by the microphone cannot be recorded or acted upon;
detecting, based on the radar data, a gesture by the object in the radar field;
determining, based on the radar data, that the gesture is a voice input trigger; and
responsive to determining the gesture is the voice input trigger, causing the microphone to enter an operational mode.

18. The method of claim 17, further comprising, responsive to not receiving a voice input within a threshold time of receiving the voice input trigger, causing the microphone to enter the non-operational mode.

19. The method of claim 17, wherein the object in the radar field is a user and the gesture is a three-dimensional (3D) gesture by the user or a movement by the user to within a threshold distance from the electronic device.

20. The method of claim 17, wherein the electronic device further comprises a voice interface module, and the method further comprises, responsive to the microphone entering the operational mode:
receiving, at a first time and by the voice interface module, a voice command, the voice command being a command directed to a device that can be interacted with via the radar-based application; and
receiving, by the radar-based application, at a second time that is later than the first time and within a threshold time of the voice interface module receiving the voice command, a 3D gesture that specifies a particular device to which the voice command is directed.

21. The method of claim 17, wherein the electronic device further comprises a voice interface module, and the method further comprises, responsive to the microphone entering the operational mode:
receiving, at a first time and by the voice interface module, a voice command, the voice command being a command to adjust a function of a device that can be interacted with via the radar-based application; and
receiving, by the radar-based application, at a second time that is later than the first time and within a threshold time of the voice interface module receiving the voice command, a 3D gesture that specifies an amount of adjustment to the function of the device that can be interacted with via the radar-based application.

22. The method of claim 17, wherein the non-operational mode further comprises the microphone being powered off.

23. The method of claim 17, wherein the non-operational mode further comprises the microphone being powered on, and the electronic device further includes a control mechanism configured to prohibit the microphone from transmitting the audio input or data based on the audio input.

24. The method of claim 23, wherein the control mechanism further comprises:
a software control signal;
a firmware control signal;
a switch;
a non-switch hardware control, or
combinations thereof.

\* \* \* \* \*